United States Patent
Singh et al.

(10) Patent No.: US 10,438,260 B2
(45) Date of Patent: *Oct. 8, 2019

(54) SYSTEM AND METHOD FOR EVALUATING CORRECTION SUBMISSIONS WITH SUPPORTING EVIDENCE

(71) Applicant: Amazon Technologies, Inc., Reno, NV (US)

(72) Inventors: Sachin B. Singh, Seattle, WA (US); Martin C. Eitreim, Seattle, WA (US); Shyam S. Sundaramurthy, Seattle, WA (US); Jiahu Deng, Seattle, WA (US); Yu Liu, Sammamish, WA (US); Ronald G. Siemens, Seattle, WA (US); Kyle Robert Stanley, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 370 days.

This patent is subject to a terminal disclaimer.

(21) Appl. No.: 14/229,600

(22) Filed: Mar. 28, 2014

(65) Prior Publication Data
US 2014/0297473 A1 Oct. 2, 2014

Related U.S. Application Data

(63) Continuation of application No. 13/360,938, filed on Jan. 30, 2012, now Pat. No. 8,688,508, which is a (Continued)

(51) Int. Cl.
*G06Q 30/06* (2012.01)
*G06Q 30/02* (2012.01)
*G06Q 10/06* (2012.01)

(52) U.S. Cl.
CPC ..... *G06Q 30/0623* (2013.01); *G06Q 10/0635* (2013.01); *G06Q 30/0218* (2013.01)

(58) Field of Classification Search
CPC .......... G06Q 10/0635; G06Q 30/0218; G06Q 30/0623
See application file for complete search history.

(56) References Cited

U.S. PATENT DOCUMENTS 5,924,072 A * 7/1999 Havens ................ G06Q 10/063
705/7.11
6,574,614 B1 6/2003 Kesel
(Continued)

OTHER PUBLICATIONS

U.S. Appl. No. 13/360,938, filed Jan. 30, 2012, Sachin B. Singh.
U.S. Appl. No. 12/137,481, filed Jun. 11, 2008, Ronald G. Siemens.

*Primary Examiner* — Asfand M Sheikh
(74) *Attorney, Agent, or Firm* — Robert C. Kowert; Meyertons, Hood, Kivlin, Kowert & Goetzel, P.C.

(57) ABSTRACT

Embodiments of a system and method for evaluating correction submissions with supporting evidence may include, subsequent to a submitter being provided with item description information for an item offered for sale, receiving a correction submission specified by the submitter. The correction submission may specify a proposed modification to an attribute(s) in the item description information. Embodiments may include generating a measure of risk associated with performing the proposed modification to the item description information. Embodiments may also include, based on an evaluation of the measure of risk and one or more risk criteria, generating an indication that specifies whether the proposed modification to the item description information is permitted to be performed. Embodiments may also include receiving information for confirming the validity of the correction submission, which may include an image (e.g., a product image), or a network address (e.g., a URL to manufacturers website), or other information described herein.

20 Claims, 12 Drawing Sheets

Related U.S. Application Data continuation-in-part of application No. 12/137,481, filed on Jun. 11, 2008, now Pat. No. 8,417,562, which is a continuation-in-part of application No. 12/137,468, filed on Jun. 11, 2008, now Pat. No. 8,146,136.

(60) Provisional application No. 60/944,386, filed on Jun. 15, 2007.

(56) References Cited

U.S. PATENT DOCUMENTS

| | | |
|---|---|---|
| 6,629,098 B2 | 9/2003 | McGeorge, Jr. |
| 6,920,463 B2 | 7/2005 | Kishimoto |
| 6,983,323 B2 | 1/2006 | Cantrell et al. |
| 7,461,033 B1 | 12/2008 | Mcconnell et al. |
| 7,477,780 B2 | 1/2009 | Boncyk et al. |
| 7,483,903 B2 | 1/2009 | Kulkarni et al. |
| 7,577,649 B2 | 8/2009 | Wu et al. |
| 7,587,353 B2 * | 9/2009 | Melchior .............. G06Q 10/10 705/37 |
| 7,881,974 B1 | 2/2011 | Thirumalai et al. |
| 7,917,941 B2 | 3/2011 | Wallman |
| 8,051,040 B2 | 11/2011 | Johnson et al. |
| 8,146,136 B1 | 3/2012 | Siemens et al. |
| 2002/0026440 A1 | 2/2002 | Nair |
| 2002/0198940 A1 | 12/2002 | Bower et al. |
| 2003/0110221 A1 * | 6/2003 | Berkowitz .......... G06F 16/2365 709/205 |
| 2003/0216913 A1 * | 11/2003 | Keely .................. G06K 9/222 704/235 |
| 2004/0078725 A1 * | 4/2004 | Little ................. G06F 11/2257 714/48 |
| 2004/0078726 A1 * | 4/2004 | Little ................. G06F 11/2257 714/48 |
| 2004/0078727 A1 * | 4/2004 | Little ................. G06F 11/2257 714/48 |
| 2004/0143516 A1 | 7/2004 | Hastie et al. |
| 2004/0243614 A1 * | 12/2004 | Boone ................ G06F 17/2725 |
| 2005/0060324 A1 | 3/2005 | Johnson et al. |
| 2005/0075946 A1 | 4/2005 | Henning et al. |
| 2005/0128069 A1 * | 6/2005 | Skatter ................ G01V 5/0008 340/522 |
| 2006/0048016 A1 | 3/2006 | Reindler et al. |
| 2006/0085108 A1 | 4/2006 | Grier et al. |
| 2006/0122858 A1 | 6/2006 | Miles et al. |
| 2006/0212930 A1 | 9/2006 | Shull et al. |
| 2006/0288285 A1 * | 12/2006 | Lai ..................... G06F 17/2725 715/708 |
| 2007/0219863 A1 | 9/2007 | Park et al. |
| 2007/0297337 A1 | 12/2007 | Beygelzimer et al. |
| 2008/0082352 A1 | 4/2008 | Schmidtler et al. |
| 2008/0097835 A1 | 4/2008 | Weiser |
| 2009/0157490 A1 * | 6/2009 | Lawyer ............... G06Q 10/063 705/59 |

\* cited by examiner

300

Harry Potter and the Deathly Hallows (Book 7)
Inventory ID: 19600715-19601228

Title
Current Title                                     Your suggestion                    302
Harry Potter and the Deathly Hallows (Book 7)   [                              ]

Author
Current Author #1                                 Your suggestion
J. K. Rowling                                     [                              ]

Current Author #1 Function                        Your suggestion
Author                                            [ Author                     ▼]

Current Author #2                                 Your suggestion
Mary GrandPré                                     [                              ]

Current Author #2 Function                        Your suggestion
Illustrator                                       [ Illustrator                ▼]

[ Add Another Author ]
                                                                                 304
Binding
Current Binding                                   Your suggestion
Hardcover                                         [ Hardcover                  ▼]

Publication Date
Current Publication Date                          Your suggestion
2007-07-21                                        [ 2007 ▼] [ July - 07 ▼] [ 21 ]

Number of Pages
Current Number of Pages                           Your suggestion
784                                               [                              ]

Edition
Current Edition                                   Your suggestion
--                                                [                              ]

Format
Current format                                    Your suggestion
--                                                [                              ]

[ Submit Changes ]

*FIG. 3*

It Won't Be Soon Before Long
Inventory ID: 01021965

Title
Current Title  
It Won't Be Soon Before Long

Your suggestion  
[ ]

Artist/Band
Current Artist #1  
Maroon 5

Your suggestion  
[ ]

Current Artist #1 Function  
Author

Your suggestion  
[ Artist ▼ ]

[ Add Another Artist ]

Label
Current Label  
A&M / Octone Records

Your suggestion  
[ ]

Binding
Current binding  
Audio CD

Your suggestion  
[ ]

Format
Current Format #1  
---

Your suggestion  
[ ]

[ Add Another Format ]

[ Submit Changes ]

*FIG. 4*

*Suggest Changes*

| | | |
|---|---|---|
| Title: | ACME Abox 180 4GB Console | 702 |
| Publisher: | ACME | |
| ESRB Rating: | Rating Pending | |
| Platform: | Abox 180 | Remove Add |
| Media: | Video Game | |
| Dimension: | Height: 7.25  Length: 12  Width: 13  Units: Inches | |
| Weight: | 10  Units: Pounds | |
| Product Details: | Camera sensor, Built-in Wi-Fi | Remove |
| Product Details: | Abox WEB , Abox 180 wireless controller | Remove |
| Product Details: | Adventure game | Remove / Add |

I know I'm correct because:

*(We will research your suggestions thoroughly. Help us by providing information which will verify it.)*

☐ The manufacturer's website verifies my changes. — 704  706
☐ There are other websites that verify my changes. —
☐ The product page contains information that verifies this change. — 708  710
☐ I have an image or images to upload which verify my submission. —
   *If at all possible, please be sure to include a shot of the ISBN or UPC in your image(s).*

Select images from your computer

- Limit your upload to a maximum file size of 4 MB
- We only accept the following file types: jpg, gif, and png

[_____] [ Browse... ] [ Clear ]
                                              \_ 712

Accept terms and conditions
☐ I have read and accept the Terms & Conditions.
The images I'm uploading are my own and meet the Content Guidelines.
[ Upload image ] — 714
[ Preview your updates ]

*FIG. 7* ically, vendors offer products and services from suppliers, though there are many that offer products and services from other consumers. While these suppliers and consumers will typically provide a description regarding each product or service offered, they are prone to errors and omissions, such that their product or service descriptions ought to be updated. While the suppliers can and do provide updates and corrections to the products and services they offer through a vendor site, quite frequently it is the consumer (i.e., one particularly interested and informed regarding a product) that is most aware of an inaccurate description, as well as how the correct description should read.
SYSTEM AND METHOD FOR EVALUATING CORRECTION SUBMISSIONS WITH SUPPORTING EVIDENCE

PRIORITY INFORMATION

This application is a continuation of U.S. patent application Ser. No. 13/360,938, filed Jan. 30, 2012, now U.S. Pat. No. 8,688,508, which is a continuation-in-part of U.S. patent application Ser. No. 12/137,481 filed Jun. 11, 2008, which claims the benefit of U.S. Provisional Application No. 60/944,386, filed Jun. 15, 2007. U.S. patent application Ser. No. 13/360,938, filed Jan. 30, 2012, now U.S. Pat. No. 8,688,508 is also a continuation-in-part of U.S. patent application Ser. No. 12/137,468 filed Jun. 11, 2008, which claims the benefit of U.S. Provisional Application No. 60/944,386, filed Jun. 15, 2007. All of the above applications and patents are incorporated herein by reference.

BACKGROUND

In order to inform consumers about available products and services, particularly when the consumers evaluate products, or services remotely over a network, the vendor site must provide accurate and robust descriptions about each and every product and service available. For those vendors that offer a large, disparate product line(s) or services, keeping the descriptions accurate is, quite frequently, an enormous task.

Typically, vendors offer products and services from suppliers, though there are many that offer products and services from other consumers. While these suppliers and consumers will typically provide a description regarding each product or service offered, they are prone to errors and omissions, such that their product or service descriptions ought to be updated. While the suppliers can and do provide updates and corrections to the products and services they offer through a vendor site, quite frequently it is the consumer (i.e., one particularly interested and informed regarding a product) that is most aware of an inaccurate description, as well as how the correct description should read.

Currently, for at least some vendors, when a consumer visits a vendor's site and becomes aware of a product or service description that should be corrected, the consumer submits correction data to the vendor. The vendor then utilizes human evaluation to compare the submitted correction data with existing product service or description prior to making any correction. If the vendor (via the human reviewer) believes the consumer's suggestions are correct, the vendor will amend the description accordingly. Unfortunately, when the number of products or services that the vendor offers is large and the number of corrections that are submitted becomes commensurately large, the review process becomes unwieldy.

BRIEF DESCRIPTION OF THE DRAWINGS

FIG. 3 is a pictorial diagram illustrating an exemplary browser page displaying descriptive attributes of a book with its current descriptive values displayed in editable or configurable fields.

FIG. 4 is a pictorial diagram illustrating an exemplary browser page displaying descriptive attributes of an audio CD with its current descriptive values displayed in editable or configurable fields.

FIG. 7 illustrates an example user interface display for receiving a correction submission and supporting evidence, according to some embodiments.

While the system and method for evaluating correction submissions with supporting evidence is described herein by way of example for several embodiments and illustrative drawings, those skilled in the art will recognize that the system and method for evaluating correction submissions with supporting evidence is not limited to the embodiments or drawings described. It should be understood, that the drawings and detailed description thereto are not intended to limit the system and method for evaluating correction submissions with supporting evidence to the particular form disclosed, but on the contrary, the intention is to cover all modifications, equivalents and alternatives falling within the spirit and scope of the system and method for evaluating correction submissions with supporting evidence as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION OF EMBODIMENTS

While the following discussion will be made with regard to correcting an item description, such as one describing a product for sale on a vendor's electronic marketplace, these principles of evaluating corrected text may be suitably applied to a variety of circumstances including, but not limited to, generally evaluating third-party corrections with regard to descriptions of any number of items, such as products, services or other types of offerings. For example, correction submissions may be made with regard to descriptions of rental or lease items, with regard to services being offered, descriptions of real estate listings, and the like. An "item" as used herein, refers to any type of object, product, service, offering, etc. for which a description may be provided. Accordingly, while the following discussion is made in regard to receiving consumer correction submissions and evaluating them for acceptance or rejection, this should be viewed as illustrative of a particular embodiment, and should not be construed as limiting upon the disclosed subject matter.

Figure 1:
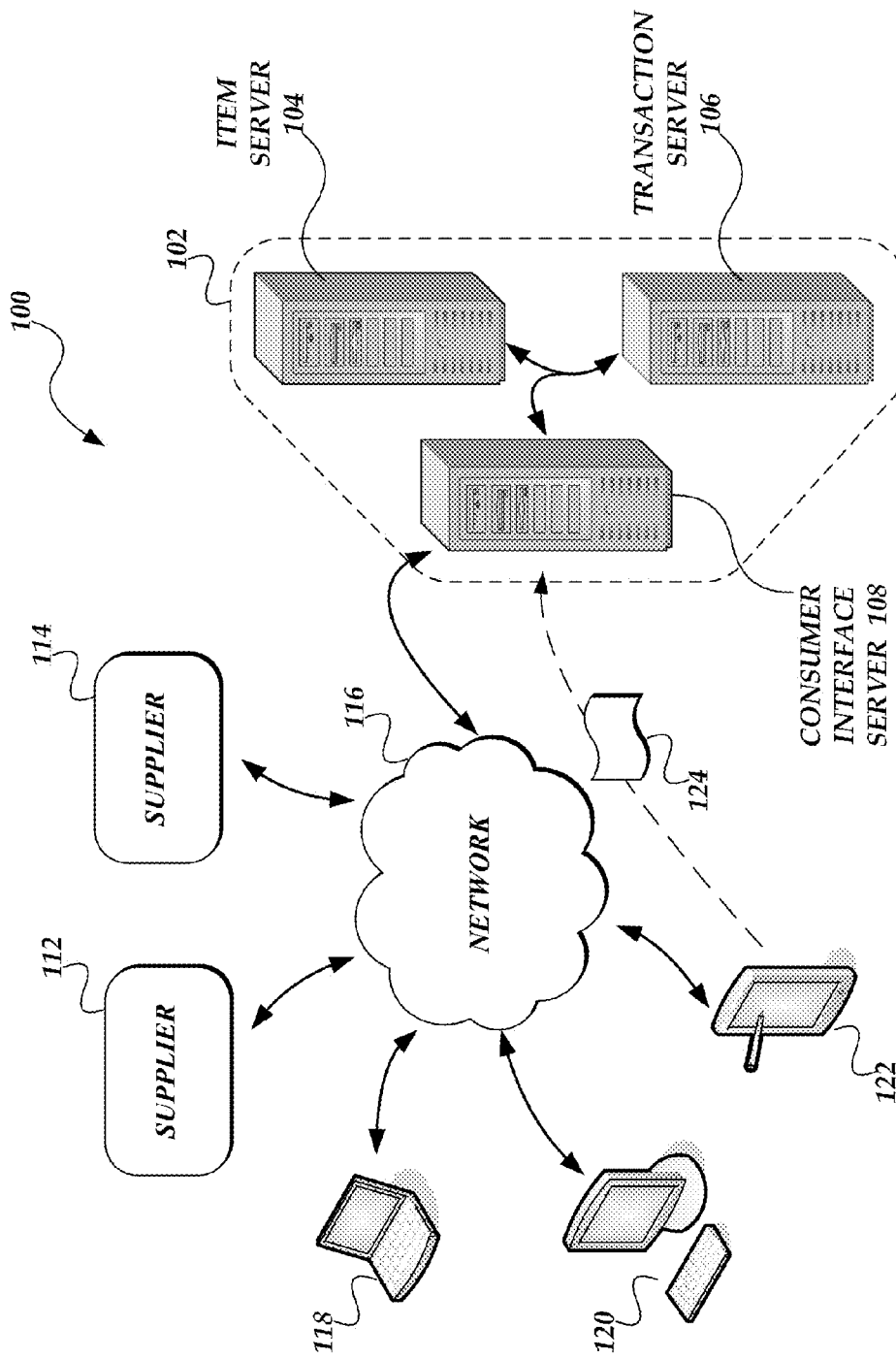
FIG. 1 is a block diagram of an example network environment suitable for obtaining and responding to correction submissions.

Turning now to FIG. 1, this is a block diagram of an example network environment 100 suitable for obtaining and responding to consumer correction submissions. As shown in FIG. 1, the network environment 100 includes a vendor site 102 for offering items to consumers, via consumer devices such as consumer devices 118-122, over a network 116. The illustrated vendor site 102 offers items from suppliers 112 and 114, who may be configured to provide descriptions for the items to the vendor site 102 over the network 116.

While a vendor site 102 may be comprised on a single node on the network 116, the disclosed subject matter is not so constrained. As shown in FIG. 1, in one embodiment, the vendor site 102 may be comprised of multiple nodes and/or servers. In the illustrated example, the vendor site 102 includes an item server 104 for at least providing information regarding items available through the vendor site; a transaction server 106 for conducting rent or purchase transactions with a consumer for an item; and a consumer interface server 108 that provides the consumer interface, sometimes referred to as the electronic marketplace, for the vendor site 102.

As further shown in FIG. 1, a consumer, via consumer device 118-122, may provide a correction submission 124 to the vendor site 102. According to various embodiments, the vendor site will evaluate and determine a score for the consumer's correction submission 124 and, based on the determined score, as well as information regarding the consumer, such as historical accuracy or reputation, either automatically accept the consumer's correction, automatically reject the consumer's correction, or pass the consumer's correction submission on for further evaluation.

Figure 2:
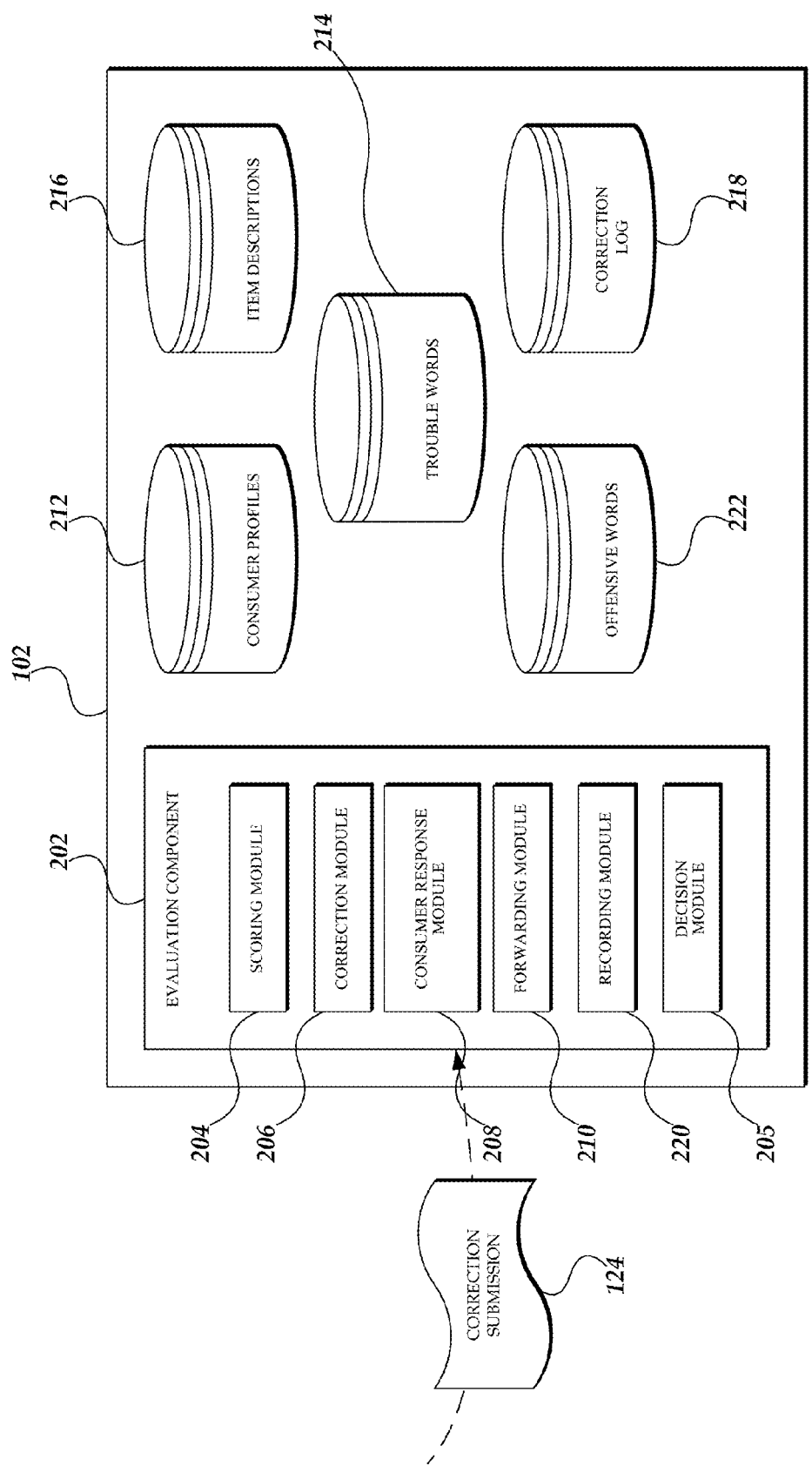
FIG. 2 is a block diagram illustrating exemplary logical components of a vendor site that maintains product descriptions for a plurality of items, and that further evaluates consumer correction submissions for acceptance or rejection.

While in FIG. 1 a vendor site 102 is illustrated as comprising multiple discrete computing devices 104-108, in an alternative embodiment, the vendor site 102 may be configured as a single node and/or computer server. Moreover, it is, in part, advantageous to discuss the vendor site 102 in terms of its logical components. To that end, FIG. 2 is a block diagram illustrating logical components of a vendor site 102 that maintains descriptions for a plurality of items, and that evaluates consumer correction submissions, such as consumer correction submission 124, for automatic acceptance or rejection, or for forwarding for further evaluation.

While comprised of physical components for executing instruction codes, including a processor and memory (not shown) that are ubiquitously found in a computing device, the illustrated vendor site 102 includes an evaluation component 202 that, upon receipt of a consumer correction submission 124, determines whether the consumer correction submission should be accepted, rejected, or forwarded on to another process (or person) for further evaluation. The vendor site 102 also includes an item descriptions data store 216 that stores item descriptions for a plurality of items available from the vendor site 102. Still further, the vendor site 102 includes a consumer profile data store 212 that stores consumer profiles for each of a plurality of consumers. A consumer's profile may include information such as whether or not the consumer is explicitly preauthorized such that any corrections are automatically accepted and/or a consumer rating for the consumer indicating one or more ratings the vendor associates with the consumer regarding entering corrections. A high confidence rating may indicate that particular corrections by that consumer are always accepted or at least substantial deference is given to the corrections from that consumer. The consumer ratings may be based on the number of correction submissions, the percentage of successful correction submissions (i.e., those that are accepted by the vendor site 102) versus those that are rejected, and the like. In addition to the consumer's rating, the various factors (as mentioned above) affecting the consumer's profile may themselves be stored and maintained in the consumer's profile in the consumer profile data store 212.

As changes/corrections are accepted and made, the vendor site 102 may also maintain a log or history of the changes. While a log or history may be stored in any number of locations, including the item descriptions data store 216, logically this information may be viewed as being stored in a correction log data store 218. In addition to storing information regarding corrections, the correction log data store 218 may include information such as previously rejected correction submissions. Previously rejected correction submissions may be used to quickly evaluate future consumer correction submissions such that duplicates can be readily rejected.

Further shown, as a logical component of the vendor site 102, is a trouble words data store 214 and an offensive words data store 222. The trouble words data store 214 identifies various symbols, words, terms, and/or phrases whose presence may indicate reason to further evaluate the proposed corrections. Similarly, the offensive words data store 222 identifies words, terms, and/or phrases that have the potential to offend, be considered vulgar, or otherwise be inappropriate. As will be made more apparent below, words, terms or phrases within either of the trouble words data store 214 or the offensive words data store 222 may suggest inappropriate language in the proposed correction or be indicative of a consumer expressing anger or frustration such that accepting corrections with these words/phrases must be made cautiously. However, sometimes item descriptions, such as titles or names of songs, etc., may include such language and/or terms. In short, while consumer correction submissions with words and phrases found in the trouble words data store 214 or the offensive words data store 222 may raise a red flag when such corrections are submitted, the mere presence of the words, terms or phrases does not mean that the correction submission can simply be ignored and rejected.

As shown in FIG. 2, the evaluation component 202 includes various logical subcomponents or modules to carry out various functions in determining whether a consumer's correction submission 124 should be accepted, rejected or forwarded for further evaluation. These modules include a scoring module 204 that determines a score for a consumer correction submission based on the results of various evaluations performed on the correction submission 124, a decision module 205 that takes the score of a submitted correction and determines whether it should be accepted, rejected, or forwarded on for further evaluation, a correction module 206 that makes the corrections to the item description in the item descriptions data store 216, a consumer response module 208 that optionally notifies the consumer that the consumer's correction submission was accepted or rejected and a forwarding module 210 that forwards the correction submission on for additional processing and/or evaluation under certain circumstances. Yet another logical module of the evaluation component 202 is a recording module 220 that records the results of the correction submission in the correction log data store 218. Those skilled in the art will appreciate that there may be other modules included in an actual evaluation component 202 that are not discussed or illustrated here. For example, an audit module (not shown) may be included in an evaluation component 202 that would cause an audit to be performed on a certain percentage of accepted correction submissions. Accordingly, the above illustrated and described components and modules should be viewed as illustrative, and not construed as limiting upon the disclosed subject matter.

It should be appreciated that the above components, modules, and subcomponents of the illustrated vendor site 102 are logical components that may be configured and combined in any number of actual embodiments, or one of a plurality of computing devices, nodes, and/or servers and combined with other components not described herein (for clarity purposes). Accordingly, the above-described configuration should be viewed as illustrative only, and not construed as limiting upon the disclosed subject matter.

With regard to items and their corresponding descriptions, as will be readily appreciated by those skilled in the art, each item is associated with at least one descriptive attribute, and each descriptive attribute may contain a descriptive value. It is the descriptive values associated with the descriptive attributes that comprise the correctable aspects of a product description. Most frequently, though not always, each item is associated with a plurality of descriptive attributes, and each descriptive attribute is associated with at least one descriptive value. Still further, items are typically categorized according to type, such that items of a given type have common descriptive attributes. Examples of item types may include books, music, videos, digital video discs (DVDs), consumer electronics, rentals, services, and the like.

An example of descriptive attributes associated with an item type is as follows with regard to books: title, author, binding, publication date, publisher, number of pages, edition, format, and language. Many of these descriptive attributes can be further defined into subattributes, and each descriptive value may be comprised of one or more entries. Still further, each entry may be comprised of a pair or tuple of values. Referring to the descriptive attribute "author," a book may have two or more authors and each should be listed. Moreover, each "author" may be identified for the particular type of contribution made, based on set of criteria such as author, adapter, collaborator, colorist, compiler, designer, drawings, editor, epilogue, foreword, illustrator, introduction, narrator, photographer, painter, reader, technical editor, translator, and the like. FIG. 3 is a pictorial diagram illustrating an exemplary browser page 300 displaying descriptive attributes of a book with current values and with editable or configurable fields for modifying those descriptive values. Examples of configurable fields include text field 302 and drop-down menu 304. Similarly, FIG. 4 is a pictorial diagram illustrating an exemplary browser page 400 displaying descriptive attributes of an audio CD (corresponding to the music product type).

According to one embodiment, when a consumer wishes to update a product description associated with an item, the consumer, via a browser on a consumer device, such as consumer device 122, will activate a link presenting the consumer with a set of descriptive attributes (according to the item's type) and corresponding current descriptive values. (Examples of item descriptions are shown in FIGS. 3 and 4.) The current descriptive values are placed in configurable data areas such that they can be suitably modified. In some instances, when the choices can be articulated as a finite set, the consumer may be presented with a drop-down menu to select one of the choices, such as drop-down menu 304 (FIG. 3). Other suitable user interface mechanisms may also be used. Still further, other descriptive values are placed in editable regions such that the consumer can modify the text or values, such as text field 302.

Figure 5A:
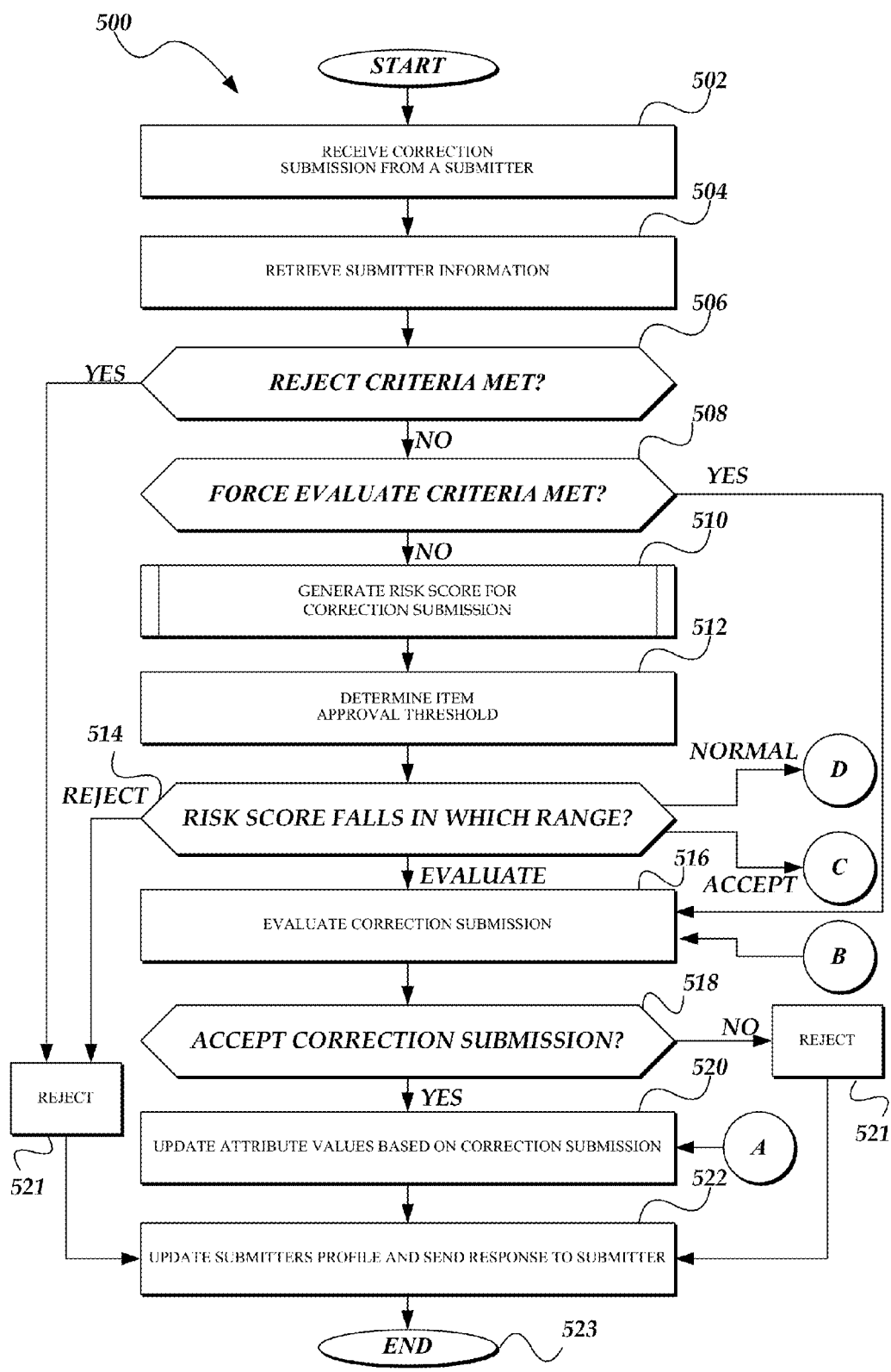
FIGS. 5A-5B illustrate a flow diagram for determining whether to accept or reject a consumer correction submission regarding an item description, in accordance with one or more embodiments.

Turning now to FIG. 5A, this figure illustrates a routine 500 for evaluating a consumer's correction submission such that it may be accepted or rejected, in accordance with one or more embodiments. With regard to the consumer submitting the correction submission, it should be appreciated while that entity is referred to as a consumer, in fact, the submitter may correspond to a supplier, an employee of the vendor site whose task it is to correct item descriptions, a manufacturer, supplier, distributor or vendor of the item, an automated system or some other interested party. Accordingly, while the term consumer correction submission is used, it should be appreciated that the disclosed subject matter, and particularly the submitter, is not restricted to being a consumer of the vendor site.

Beginning at block 502, the consumer's correction submission is obtained. At block 504, the submitting consumer's profile information is retrieved from the consumer profile data store 212. As described above, the consumer's profile may include an explicit indication as to whether or not to accept the consumer's correction submission. Still further, the consumer's profile may include information as to whether to automatically accept or reject any correction submissions from this particular consumer or require a manual evaluation of any correction submissions from the consumer.

At decision block 506, a determination is made as to whether any of various rejection criteria are met such that the correction submission should be rejected without further review. According to certain aspects and by way of illustration, but not limitation, rejection criteria may include corrections directed to particular item descriptions (such as corrections to a well known item), particular attributes of a particular item (e.g., a title and/or author), the value to which an attribute is changed (such as changing a movie rating from general family to adult only), whether the consumer's profile indicates that the system should always reject correction submissions from this consumer, and the like. If the evaluation of the rejection criteria indicates that the consumer's correction submissions should be rejected, the routine 500 proceeds to block 521 and the correction submission is rejected. At block 522, consumer's profile information is updated, in this instance to identify that the correction submission was automatically rejected, and optionally a response is delivered to the consumer. A response may be in the form of an e-mail message indicating to the consumer the decision that has been made with respect to the correction submission.

Returning to decision block 506, if it is determined to not automatically reject the correction submission, at decision block 508 a determination is made as to whether force evaluation criteria are met such that the correction submission is to be evaluated prior to acceptance or rejection. Force evaluation criteria may be, for example, an indication that all correction submissions from the consumer should be evaluated, an indication that all correction submissions of a particular type (e.g., change to title, rating, etc.) for an item should be evaluated, etc. In one embodiment, but not by way of limitation, if the consumer's profile indicates that correction submissions from this consumer should always be evaluated, the force evaluation criteria is met and the routine 500 proceeds to block 516 where the correction submission is evaluated. The evaluation at block 516 may be a manual review of the correction submission to determine whether to accept or reject the consumer correction submission. Returning to decision block 508, if it is determined that the force evaluation criteria has not been met the routine proceeds to subroutine block 510 (FIG. 6A) in which a risk score (or another measure of risk) is generated for the correction submission. A risk score may be any type of rating for the item. For example, a risk score may be a scaled numerical rating, a percentage rating, etc. After generating a risk score for the correction submission, at decision block 512 an item approval threshold, which may also be any type of numerical rating, is determined. The item approval threshold may be established, for example, based on results from prior correction submissions for the item, based on the frequency with which correction submissions are submitted for the item, the importance of the item, etc. In one embodiment, the item approval threshold may be segmented into multiple ranges. For example, the item approval threshold may be segmented into an accept range, normal range, evaluate range and a reject range. In alternative embodiments, additional or fewer ranges may be utilized for evaluating correction submissions and the segmentation of ranges described herein is for explanation purposes only and is not intended to be limiting.

Figure 5B:
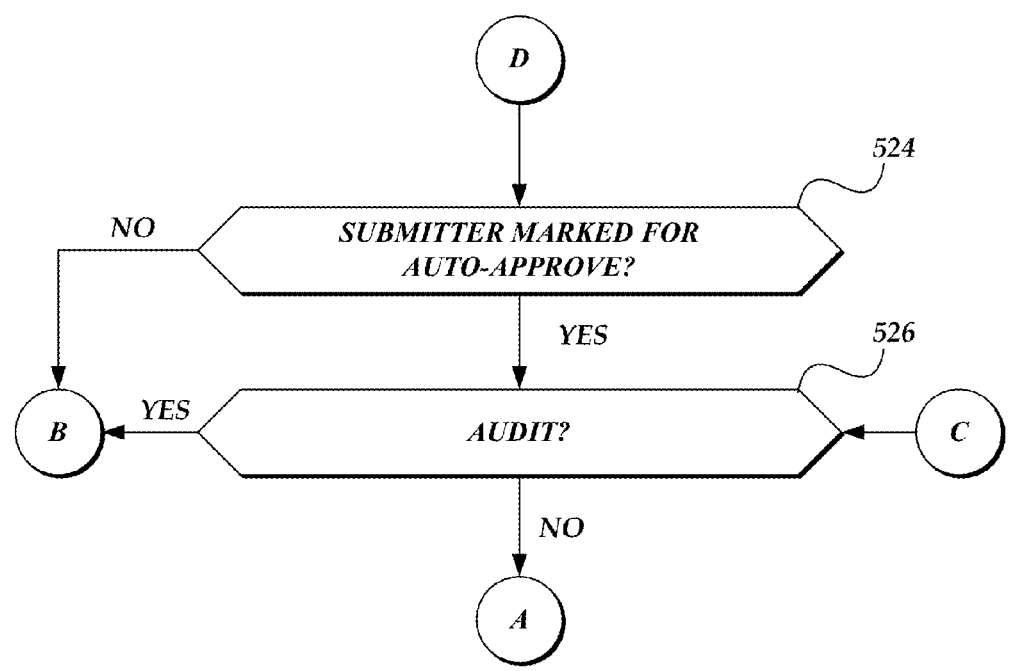

At decision block 514 a determination is made as to which item threshold range the risk score generated at subroutine block 510 falls. If it is determined that the risk score falls into the reject range, the routine 500 proceeds to block 521, the correction submission is rejected and the process continues as described above. If it is determined that the risk score falls into the normal range, the routine 500 proceeds to decision block 524 (FIG. 5B) and a determination is made as to whether the consumer is marked for auto-approval. If the consumer is marked for auto-approval, at decision block 526 a further determination is made as to whether the submission should be audited. Auditing, as in typical instances, may be conducted on a random, pseudo-random, or periodic basis (e.g., every $10^{th}$ submission) and may be provided for quality control. In alternative embodiment, if it is determined that the consumer is marked for auto-approval, the correction submission may be approved without determining if an audit should be conducted. If it is determined at decision block 526 that the submission is not to be audited, the routine 500 proceeds to block 520 and the attribute values for the item are updated based on the correction submission. If it is determined at decision block 526 that the correction submission is to be audited or if it is determined at decision block 524 that the consumer is not marked for auto-approval, rather than automatically approving the correction submission, the correction submission is passed on for further evaluation at block 516 as discussed below.

Returning to decision block 514, if it is determined that the risk score falls into the accept threshold range, the routine 500 proceeds to decision block 526 and continues as described above. Finally, if it is determined at decision block 514 that the risk score falls into the evaluate threshold range the routine 500 proceeds to block 516 and the correction submission is evaluated, as described above. Upon evaluation of the correction submission, at decision block 518 a determination is made as to whether to accept the correction submission. If it is determined at decision block 518 that the correction submission should be accepted, at block 520 the attribute values for the item description are updated based on the correction submission. At block 522 the consumer's profile is updated, in this instance to reflect that the correction submission has been accepted and the consumer may optionally be notified in this regard. In contrast, if it is determined at decision block 518 that the correction submission should not be accepted the attribute values are not updated, the correction submission is rejected at block 521 and the consumer's profile is updated at block 522 to reflect that the correction submission has been rejected. In addition, at block 522 a response may optionally be sent to the consumer notifying them that the correction submission has not been accepted. The routine 500 completes at block 523.

A consumer's correction submission may include numerous pieces of information and/or data. Utilizing that information, a comparison of the current value of an attribute versus the submitted value of the attribute may be made. For example, assuming an attribute "title" of a book, the current attribute value for the title may be "The Chocolate Factory" whereas the submitted attribute value might be "Charlie and the Chocolate Factory." In this case, the submitted attribute value represents a proposed correction from the consumer.

Figure 6A:
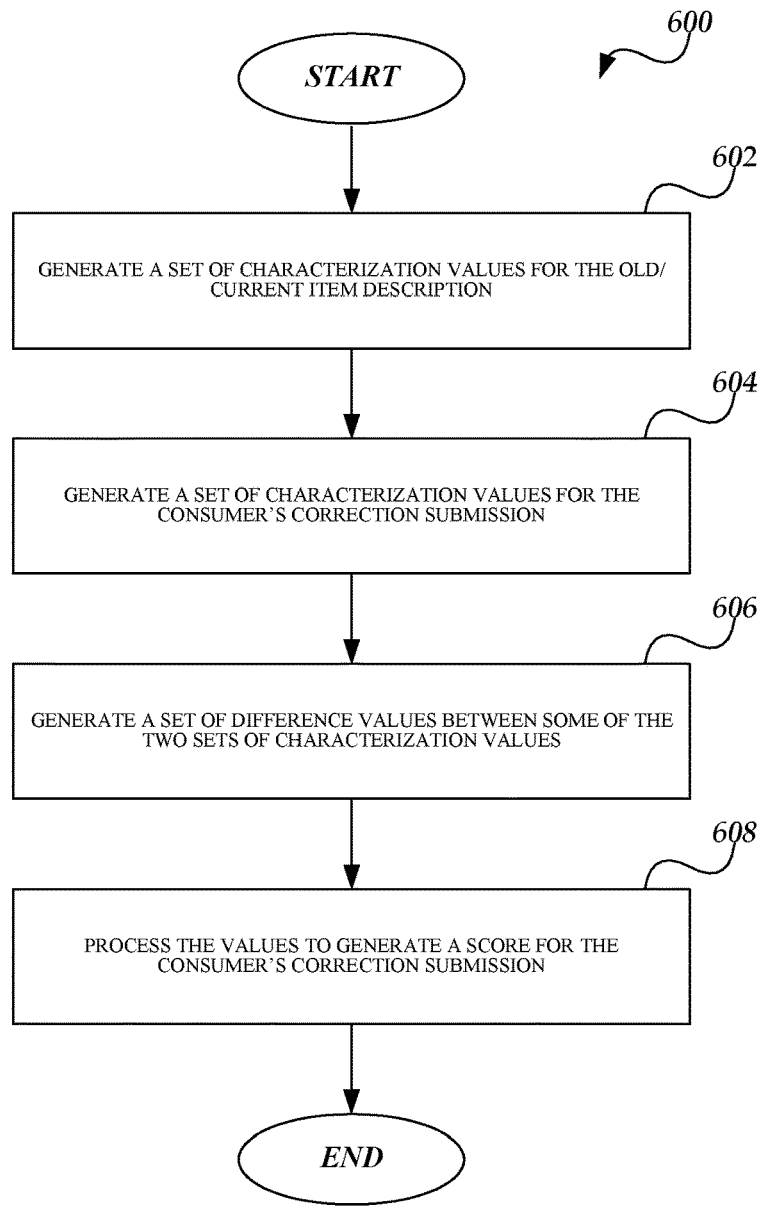
FIGS. 6A and 6B illustrate a flow diagram for generating a score for a consumer's correction submission, and four ranges on a scale, respectively, in accordance with one or more embodiments.

As mentioned above in regard to subroutine block 510 of FIG. 5A, a score is generated for a correction submission. To this end, FIG. 6A is a flow diagram of an illustrative subroutine 600 for determining a score for a consumer's correction submission, in accordance with one or more embodiments. In general, the subroutine 600 analyzes the current descriptive values and submitted descriptive values by characterizing each. The characterizations generally, but not exclusively, consist of determining a number of quantifying and/or descriptive elements of each value. For example, the length or number of characters in the value (for both the current descriptive value and submitted descriptive value) is one descriptive element. Another one might be the number of capital letters in each descriptive value. Another may be the number of punctuation characters in each descriptive value. Another may be a count of word matches from an inappropriate language dictionary. Many of these quantities or descriptive elements together characterize each descriptive value. The characterization consists of determining a number of quantifying or descriptive elements (i.e., criteria) of each descriptive value of both the current descriptive value and the submitted descriptive value string including, but not limited to:

a length value corresponding to the count of characters in the descriptive value string;
 a lowercase character count corresponding to the count of lowercase characters in the descriptive value string;
 an uppercase character count corresponding to the count of uppercase characters in the descriptive value string;
 a punctuation count corresponding to the count of punctuation characters in the descriptive value string;
 a word count corresponding to the count of words in the descriptive value string;
 a significant word count corresponding to the count of significant words (e.g., words with more than 3 characters) in the descriptive value string;
 a capital word count corresponding to the count of capitalized words in the descriptive value string;
 an odd capitals count corresponding to the count of words with odd capitalization (e.g., uppercase letters in the middle of a word or multiple uppercase letters in a word) in the descriptive value string;
 a repeat count corresponding to the maximum any character is repeated in an adjacent sequence in the descriptive value string;

an uppercase word count corresponding to the count of all uppercase words in the descriptive value string;

a significant lowercase word count corresponding to the count of significant (e.g., words with more than 3 characters) that are all lowercase;

a trouble word count corresponding to the count of trouble words and/or expressions (from a list of trouble patterns) that are found in the descriptive value string;

an offensive words count corresponding to the count of offensive words and/or expressions (from a list of offensive patterns) that match the descriptive value string;

a significant word set corresponding to the set of significant words in the descriptive value string; and a word set corresponding to the set of all the words in the descriptive value string.

Of course, descriptive values for elements associated with drop-down menus will likely use a different set of characterizations and may include additional, fewer or some other combination of characterizations.

In the illustrative subroutine 600, at block 602 a set of characterization values are generated for the current descriptive value, and at block 604 a corresponding set of characterization values are generated for the submitted descriptive value. For purposes of description, characterizing descriptive values generated according to the above and other criteria will generally be termed C1, C2, C3, . . . , Cn. More particularly, the characterization of the original descriptive values will be termed OC1, OC2, OC3, . . . OCn, ie, "Original Characterization n". Alternatively, for the characterization of the submitted (or "new") descriptive value, the characterization values will be termed NC1, NC2, NC3, . . . NCn, ie, "New Characterization n".

In addition to generating the characterization values for each descriptive value string, at block 606 the differences between the set of characterization values are determined, yielding yet another set of values, termed difference values. These difference values will be termed D1, D2, D3, . . . Dm, where D1 represents the difference between a given pair of corresponding characterization values, such as OC1 and NC1, D2 represents a difference between another pair of corresponding characterization values, such as OC2 and NC2, etc. Of course, while the characterization values may often result in a numeric value, the computation of the differences for individual values may be derived differently than a simple numeric difference. For example, with regard to the differences between word sets in each string, the differences may be based not only on the ordinal value of exact matches between words, but also on words that match according to a Levenshtein score (taking into account a particular threshold). Similarly, a difference value may be generated from the same set of characterization values such as a word difference score that measures the number of words not found in common to both word sets that further takes into account the Levenshtein score and a threshold.

At block 608, the various values, both characterization values and difference values, are then processed by a scoring algorithm that yields a numeric score corresponding to a confidence value that the consumer's correction submission is accurate and/or acceptable. After processing the values to generate a numeric score, the routine 600 terminates.

In one embodiment, the scoring algorithm applies mathematical function to each element and sums the result according to the formula:

$$\text{Score} = \sum_{x=1}^{n} FOx(OCx) + \sum_{x=1}^{n} FNx(NCx) + \sum_{x=1}^{m} FDx(Dx)$$

where FOx(OCx) is a function applied to the characterizing values of the original product descriptive value string, FNx(NCx) is a function applied to the characterizing values of the consumer's correction submission, FDx(Dx) is a function applied to the difference values, n corresponds to the number of characterization values generated for each of the original and new descriptive values, and m corresponds to the number of difference values determined between the original and new descriptive values: i.e., m<=n as not all characterization values may be used in difference calculations. In this manner, the overall score corresponds to a risk value that the consumer's new correction submission is accurate and/or acceptable, where the risk value is based on the current and new characterizations, their differences, and mathematical formulae that may include weighting the various characterizations differently. For instance, in some cases the weighting applied to FDx(Dx) may be greater than that applied to the first two terms in the score formula. In some cases, some terms in the score formula may be omitted while others remain. For instance, in one non-limiting example, the FDx(Dx) term may remain within the formula while the FOx(OCx) and FNx(NCx) are omitted. In other cases, other combinations and/or weightings of terms may be utilized. Stated somewhat differently, the resulting score corresponds to an estimation of the risk in automatically accepting the consumer's correction submission, according to various embodiments.

In regard to the various functions applied to the characterization values and difference values, while there are any number of specific functions that may be applied, these functions may include, by way of illustration only, an identity function, a weighting/scaling function (to enhance or diminish the value), a null function, and an inverse function.

Figure 6B:
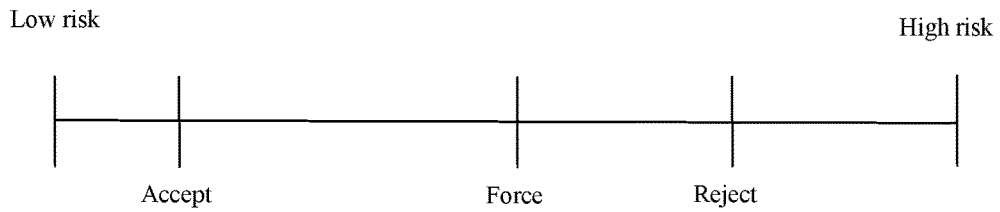

Preferably, the resulting risk score groups small or trivial changes between the current and new descriptive values at one end of the scale and large or significant changes at the other end. By way of example and not by means of limitation, trivial changes result in a low score, perhaps in the range of 0 to 100, while significant changes fall in the range of 500 and greater. In this manner, the risk score describes the degree of change between the old or current product description and the submitted product description. Alternatively, the risk score might also be viewed as a measure of the risk of whether the submitted correction is good or not. The product type of the subject item and the attribute type to which the submission applies determines three threshold values (accept,force,reject) to use in considering the score. These thresholds may come from a data store indexed by the product-type and attribute-type or may be considered as a function T(threshold, product-type, attribute-type). For example, T(accept, book, title) is the function determining the "accept" threshold for a submission suggesting a change to a book's title. As depicted in FIG. 6B, four ranges on the scale are defined by the three threshold values.

Going from low risk to high risk on the scale depicted in FIG. 6B, the ranges have the following significance. The first range is for scores falling below the accept threshold and indicates an automated decision to accept the submission. The next range defined from the accept to the force threshold indicates no automated decision should be made.

The range above the force threshold up to the reject threshold indicates submissions with these scores will necessitate (force) an evaluation, such as by a human reviewer. The final range above the reject threshold indicates an automated decision to reject the submission can be made.

In various embodiments, one or more components of vendor site 102 may also be configured to generate a user interface configured to enable correction submitters to also provide supporting evidence for establishing credibility of their correction submissions. FIG. 7 illustrates an example user interface display that components of vendor site 102 may generate and provide to correction submitters (e.g., via devices 118-122 in FIG. 1). Similar to the user interfaces of FIGS. 3 and 4 described above, the illustrated user interface display may include one or more fields 702 for receiving user specified corrections. The fields 702 may be automatically populated with the existing data so that the correction submitter can easily modify the data. In various embodiments, some or all of this submitted information may be considered a correction submission.

In the illustrated embodiments, user interface display 700 may also include fields 704-714 for submitting information for verifying the changes specified in fields 702. In the illustrated embodiment, the user may select one or more of fields 704-710 to indicate the source of the information to be submitted. For instance, selection of field 704 may indicate that one or more of the proposed changes specified in fields 702 may be validated with information from the manufacturer's website. In another example, selection of field 706 may indicate that one or more of the proposed changes specified in fields 702 may be validated with information from another website. In yet another example, selection of field 708 may indicate that one or more of the proposed changes specified in fields 702 may be validated with information from vendor site 102. For instance, vendor site 102 may provide one or more item detail pages; the correction submitter may provide one or more of these item detail pages as evidence of the correctness of the information submitted in fields 702. Furthermore, while not illustrated in this particular example, should the correction submitter select any of fields 704-708, the user interface may provide an additional field for specifying the web address (e.g., a Uniform Resource Locator (URL) or other identifier of a network location). As described in more detail below, one or more components of vendor site 102 (e.g., evaluation component 202) may retrieve information from such a network location for validating the correction submission specified in fields 702.

In various embodiments, user interface display 700 may also include a field 710 for designating that the information supporting the correction submission may be submitted by the correction submitter (e.g., a customer or other individual). For instance, in the illustrated embodiment, to verify that the gaming console does indeed come equipped with a camera sensor, a customer might capture and upload one or more images of the respective item, the item's packaging, and instructions manual, and/or other paperwork supplied with the item. These images may contain proof that the correction submission is correct. For instance, if the images include a picture of the product itself, the camera sensor may be easily visible within the images. In another example, if the images include a picture of the product packaging, a feature list on the product packaging may indicate that a camera sensor is a feature of the product. As described in more detail below, images may also include machine-readable indicia (e.g., an optical code or barcode, such as a Universal Product Code (UPC), PDF417 code, QR code) or other item identifiers that may be helpful for ascertaining the validity of the correction submission. In various embodiments, the user interface display may also include one or more controls 714 for submitting the correction submission and the supporting evidence (e.g., a URL or image) for validating the correction submission. In various instances herein, the information that a correction submitter provides to support the validity of their correction submission may be referred to herein as correction validation information. By providing the correction validation information, a determination of whether to accept or reject a correction submission by a particular correction submitter may be made without regard to the trustworthiness of the correction submitter. For example, if the validity of the correction submission can be determined from the correction validation information, there may be no need to determine whether the correction submitter is marked for auto-approval (see, e.g., step 524 in FIG. 5B).

Figure 8A:
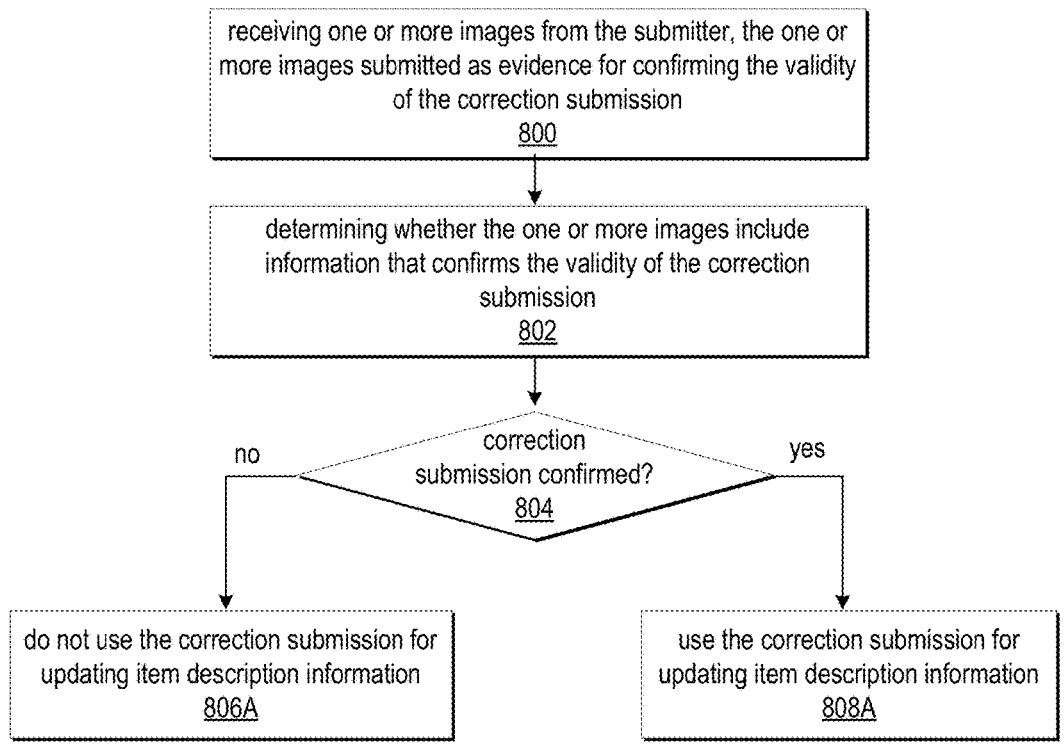
FIGS. 8A-9B illustrate flowcharts of example methods for handling correction submissions and supporting evidence, according to some embodiments.
Figure 8B:
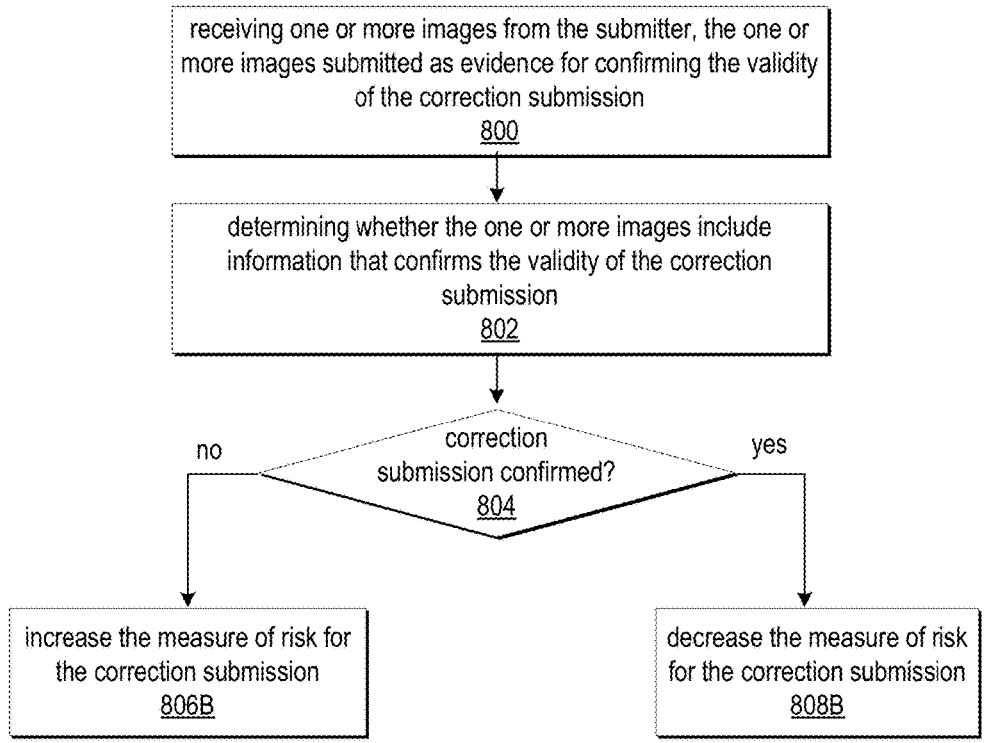

As described above, in various embodiments, the correction validation information provided by a submitter may in some cases include one or more images of a product or product packaging. FIGS. 8A and 8B illustrate methods for receiving, evaluating and using the correction validation information. In various embodiments, any of the methods described herein may be implemented by a computer, such as the computer system of FIG. 11 described below. In various embodiments, the methods described herein may be performed by specific components described above, such as evaluation component 202 of FIG. 2. As illustrated at block 800 of FIG. 8A, the method may include receiving one or more images from the submitter. Although the description herein largely refers to evaluating such images, various other embodiments may also be configured to apply the techniques described herein to other electronic representations of information including but not limited to other types of electronic information (e.g., document files, PDF files, video files, audio files, multimedia files, presentations, etc.). In various embodiments, the one or more images may be submitted as evidence for confirming the validity of the correction submission (e.g., images of items, item packaging, manuals, and/or paperwork supplied with the item). In one example, these images may be received along with one or more corresponding item corrections. For instance, both item corrections and corresponding correction validation information (e.g., one or more images of items and/or item packages) may be sent from customer device 122 to the vendor site 102 as part of data 124 (see, e.g., FIG. 1). In another example, a customer or other correction submitter may provide one or more images by uploading the images to vendor site 102 through a user interface display, such as user interface display 700 of FIG. 7 described above (e.g., via control 714). In various other embodiments, the images may be submitted through any number of devices, such as computers (e.g., desktops, laptops, and netbooks) or mobile devices (e.g., phones, smartphones, and media players). The images may be obtained from any suitable image capture device, such as a camera system (e.g., a camera system associated with a mobile device) or a scanner.

As illustrated at block 802, the method may also include determining whether the one or more images include information that confirms the validity of the correction submission. In various embodiments, this portion of the method may include confirming the validity of the submitter's correction by searching within the images for information that matches the correction submission. Generally, if the image(s) contains the matching information, the image(s) may be considered as a confirmation of the submitted correction's validity. For instance, within the context of FIG. 7, if the correction submitter indicates that a "camera sensor" should be added to the item description information of the item, the method may include searching for information that matches a "camera sensor" within the one or more images that are submitted. In various embodiments, searching for the matching information may include performing one or more machine recognition techniques to determine whether the images include information that matches the correction submission. For instance, the method may include performing optical character recognition (OCR) on the images to identify text that matches the correction submission. For instance, an image may display product packaging that lists features of the corresponding item. In this example, OCR may be utilized to detect the features of the corresponding item and determine whether any of those features match the proposed modification of the correction submission.

In some embodiments, the determination of block 802 may include one or more elements of human review. For instance, if machine recognition techniques fail to render a definitive or reliable determination, the determination may be performed by a human reviewer. In some cases, this determination may be sent to a service that matches tasks to human agents capable of performing such tasks (e.g., capable of determining whether an image, web page, or other electronic information includes information that confirms the validity of the correction submission). For instance, the determination at block 802 may also include issuing a request to a pool of human workers to confirm the validity of correction submission or data included in the images. In some instances, this pool of human workers is outside of an organization that employs or contracts with the operator of vendor site 102 and/or is otherwise independent of vendor site 102. In some instances, the pool of human workers comprises a pool of "unskilled" workers—or human workers that either do not have formal training for identifying the documents or are not required to have formal training for inclusion into the pool. In some instances, the pool of human workers may comprise a crowdsourcing Internet marketplace, such as Mechanical Turk™ by Amazon.com™, Google Answers™ by Google™, or another such service. In each of these instances, human workers of the pool of human workers may receive the request from the requestor over a network and engage in subsequent communications with the requestor over the network. For instance, the requestor may publish the request to a particular website associated with the pool and human workers of the pool may receive the request via the website. After identifying confirming or denying the validity of the correction submission, the worker may then upload the documents to the vendor site 102 via the website. (The aforesaid technique may also be applied to perform the determination of block 904 of FIGS. 9A and 9B described below.)

In some embodiments, performing the machine recognition techniques described herein may include performing image recognition techniques (e.g., object, pattern, or color recognition techniques) in order to identify information that matches a submitted correction. For instance, if a correction submission specifies that a dining set includes one table and four chairs, the method may include performing object recognition on correction validation information including an image of the dining set to determine the contents of the image. For instance, the method may include using object recognition techniques on the image to determine that the image conveys a visual representation of a table and four chairs. In other non-limiting example, a correction submission may specific that a bicycle frame is a specific color, and the method may include performing object recognition techniques to verify that the bicycle frame is that specific color.

As illustrated by the negative output of block 804, if the correction submission is not confirmed (e.g., if the proposed modification is not validated by the submitted image or images), the method may include proceeding to block 806A. In this case, the correction submission is not used for updating the item description information (block 806A). For instance, the correction submission may be designated as unreliable or discarded. (FIG. 8B illustrates other techniques for handling this situation). In some cases (e.g., when machine recognition techniques do not form a definitive answer), instead of not using the information, the information may instead be sent for further review by a human agent, such as described above with respect to block 802). As illustrated by the positive output of block 804, the method may include using the correction submission for updating the item description information (block 808A). For instance, this portion of the method may include updating item description information that is served by item server 104.

FIG. 8B illustrates another example method for receiving, evaluating and using the correction validation information. In the illustrated method, blocks 802-804 may be similar or identical to the like-numbered blocks of FIG. 8A. However, in the example embodiment illustrated in FIG. 8B, instead of accepting or rejecting the correction submission based on the validation (or lack of validation) of the correction submission, the method of FIG. 8B may incorporate the validation result of the correction submission into the generation of a measure of risk for the correction submission. One example of measures of risk includes the risk scores described above (see, e.g., FIGS. 5A-6). In various embodiments, if it is determined that the received images do not validate the correction submission (e.g., negative output of block 804), the method may include increasing the measure of risk for the correction submission (block 806B). For instance, irrespective of whether the correction submission is confirmed, a risk score (or other measure of risk) may be generated for the correction submission according to any of the techniques described herein (see, e.g., FIGS. 5A-6). At block 806B, this measure of risk may be increased (e.g., scaled or weighted) by some fixed or relative amount in order to increase the risk associated with automatically accepting the proposed modification specified by the correction submission. For instance, when using the acceptance techniques described above (see, e.g., FIGS. 5A-6), increasing the measure of risk at block 806B may decrease the chance that the proposed modification of the correction submission will actually be implemented (e.g., updating item description information that is served by item server 104).

In various embodiments, if it is determined that the received images do validate the correction submission (e.g., positive output of block 804), the method may include decreasing the risk score for the correction submission (808B). For instance, irrespective of whether the correction submission is confirmed, a risk score (or other measure of risk) may be generated for the correction submission according to any of the techniques described herein (see, e.g., FIGS. 5A-6). At block 808B, this measure of risk may be decreased (e.g., scaled or weighted) by some fixed or relative amount in order to decrease the risk associated with automatically accepting the proposed modification specified by the correction submission. For instance, when using the acceptance techniques described above (see e.g., FIGS.

5A-6), decreasing the measure of risk at block 808B may increase the chance that the proposed modification of the correction submission will actually be implemented (e.g., updating item description information that is served by item server 104).

In some cases, images provided as correction validation information may include optical codes specifying product identifiers. In various embodiments, including but not limited to that of FIG. 8B, machine recognition techniques may be utilized to identify and decode one or more optical codes within the images submitted as correction validation information. For instance, such images may include optical codes that encode product identifiers. The presence of such optical codes within the images submitted as correction validation information may add legitimacy to the correction validation information. As such, in some embodiments, the method may include using machine recognition techniques to identify optical representations of product identifiers (e.g., bar codes). In these embodiments, if the product identifier of the optical code matches the product identifier of the item for which the correction is submitted, the method may include designating the correction submission as valid and/or decreasing the risk score for the correction submission (in some cases significantly decreasing the risk score). Similarly, if the product identifier of the optical code does not match the product identifier of the item for which the correction is submitted, the method may include designating the correction submission as invalid and/or increasing the risk score for the correction submission (in some cases significantly increasing the risk score).

FIGS. 8A-8B are generally directed to processing image-based correction validation information. However, in other cases, correction validation information may be provided as a network location (e.g., a Uniform Resource Locator (URL)) of network content for validating a correction submission. For instance, within the context of FIG. 7, a correction submitter may select any of controls 704-708 and specify a URL of the specific web page that validates the correction submission information (e.g., some or all of the information specified in fields 702). In some cases, this may be a web page of vendor site 102, in which case the vendor should be able to directly access such and interpret such information. For instance, the item detail pages of vendor site 102 may be relatively structured (e.g., compared to external web pages). For example, the vendor's own site may adhere to a structure with which the vendor and/or the vendor site systems are generally familiar. As such parsing these item detail pages may be less difficult than other web sites that may not necessarily adhere to a structure with which the vendor is familiar. Examples of these other websites may include manufacturer websites (e.g., the manufacturer of the item for which information is being corrected) and websites of other parties (e.g., technology blogs, personal blogs, periodicals, etc.). For instance, www.manufacturer.comkproduct category>/<model number> may represent an example addressing scheme of a manufacture's site that adheres to a tree structure of product categories and item models categorized under such categories. Embodiments may include interpreting the tree structure (or other structure) to navigate to appropriate product information on the manufacturer's website. This type of navigation may be performed for known URLs as well as unknown URLs. For instance, in cases where a submitter does not provide a specific URL (or provides an incorrect URL), embodiments may include constructing new URLs adhering to the tree structure addressing scheme in order to locate information for specific items (e.g., by product category and/or model number). As described in more detail (e.g., with respect to FIG. 9B), embodiments may include assigning different levels of confidence to these sources of correction validation information and using those confidence levels to modify a measure of risk associated with a proposed modification.

Figure 9A:
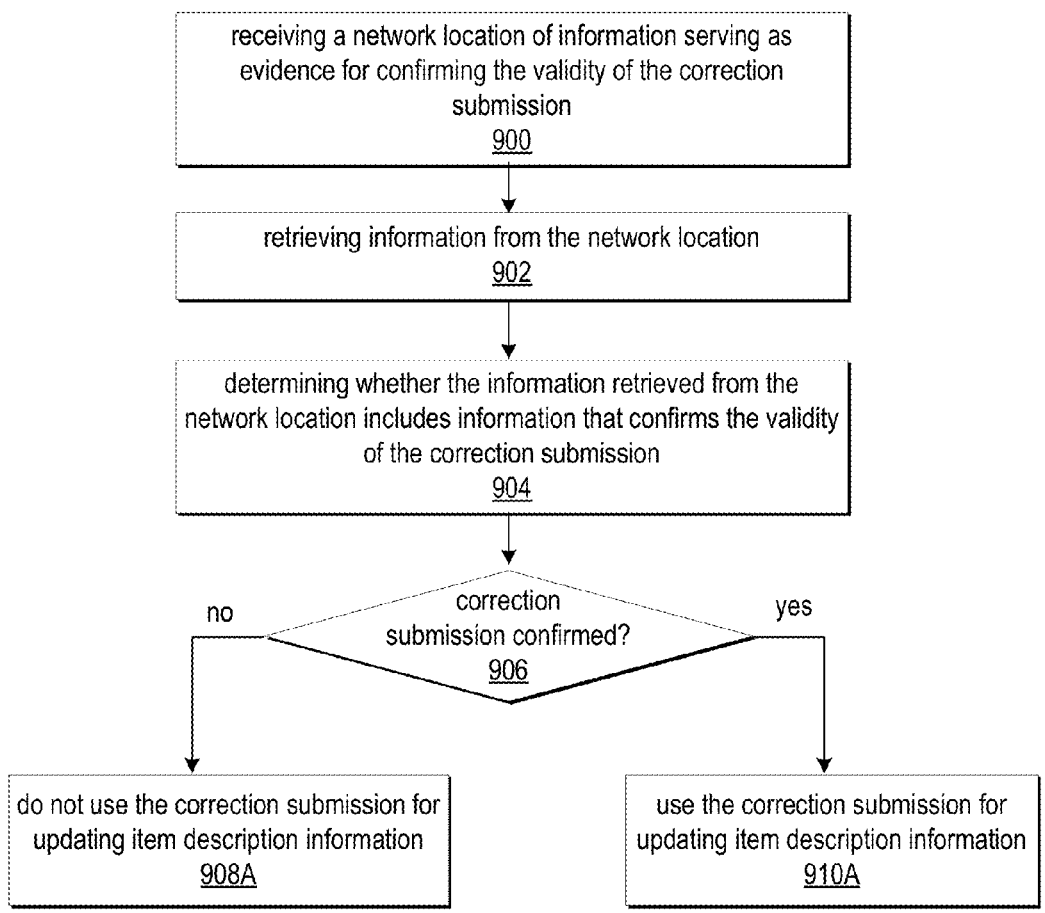

FIG. 9A illustrates an example method for receiving, evaluating, and using correction submission information that is provided as a network location (e.g., a URL), such as the example network locations described above. As illustrated at block 900, the method may include receiving a network location of information serving as evidence for confirming the validity of the correction submission. For instance, this portion of the method may include receiving a URL of a web page (e.g., a web page of vendor site 102, a web page of a manufacturer, or a web page of some other party). In one non-limiting example, a correction submitter may provide a URL to a web page that includes specifications or other details about the item in question. For example, to submit a correction indicating that a media player is capable of playing files of a certain file type, a correction submitter may submit a URL of a web page that specifies the playback capabilities of the media player. In certain embodiments, the URL may be determined or derived from one or more images received from a submitter (see, e.g., block 800 in FIGS. 8A and 8B). For example, if the product packaging includes a URL or a URL encoded in an optical code, such as a QR code, the URL may be extracted from the image itself. By way of another example, if a brand name or manufacturer name is identified in an image (e.g., from OCR data), the URL may be generated or determined (e.g., by a lookup in a local or remote database) from the brand name or manufacturer name. For instance, if "Acme, Inc." and "model number 1234" is identified in the image, the method may attempt to retrieve verifying data from www.acme.com/model1234.

As illustrated at block 902, the method may also include retrieving information from the network location. For instance, in the case of a URL, the method may include performing a request for a web page residing at the URL and receiving a response including the requested information. In some embodiments, the method may include performing one or more web scraping techniques for removing relevant information from the requested network location. In some cases, the information received from the network location may include images or other media. In these cases, any of the machine recognition techniques described above (e.g., OCR) may be utilized to extract information for review.

As illustrated at block 904, the method may include determining whether the information retrieved from the network location includes information that confirms the validity of the correction submission. In various embodiments, this portion of the method may include confirming the validity of the submitter's correction by searching within the retrieved information for information that matches the correction submission. Generally, if the retrieved information contains the matching information, the retrieved information may be considered as a confirmation of the submitted correction's validity. For instance, if the correction submitter indicates that a "WiFi enabled" feature should be added to the item description information of the item, the method may include searching for information that matches "WiFi enabled" within the information retrieved from the specified network location. In various embodiments, any of the machine or human recognition techniques described above with respect to block 802 may also be implemented in the block 904 portion of the method. For instance, data or information retrieved from the specified network address may include images or any other form of media or document described herein. Embodiments of the method may include evaluating such data or information according to any of the machine recognition techniques and/or human review techniques described herein.

As illustrated by the negative output of block 906, if the correction submission is not confirmed (e.g., if the proposed modification is not validated by the information retrieved from the specified network location), the method may include proceeding to block 908A. In this case, the correction submission is not used for updating the item description information (block 908A). For instance, the correction submission may be designated as unreliable or discarded. In some cases (e.g., when machine recognition techniques do not form a definitive answer), instead of not using the information, the information may instead be sent for further review by a human agent, such as described above with respect to block 802). As illustrated by the positive output of block 906, the method may include using the correction submission for updating the item description information (block 910A). For instance, this portion of the method may include updating item description information that is served by item server 104.

Figure 9B:
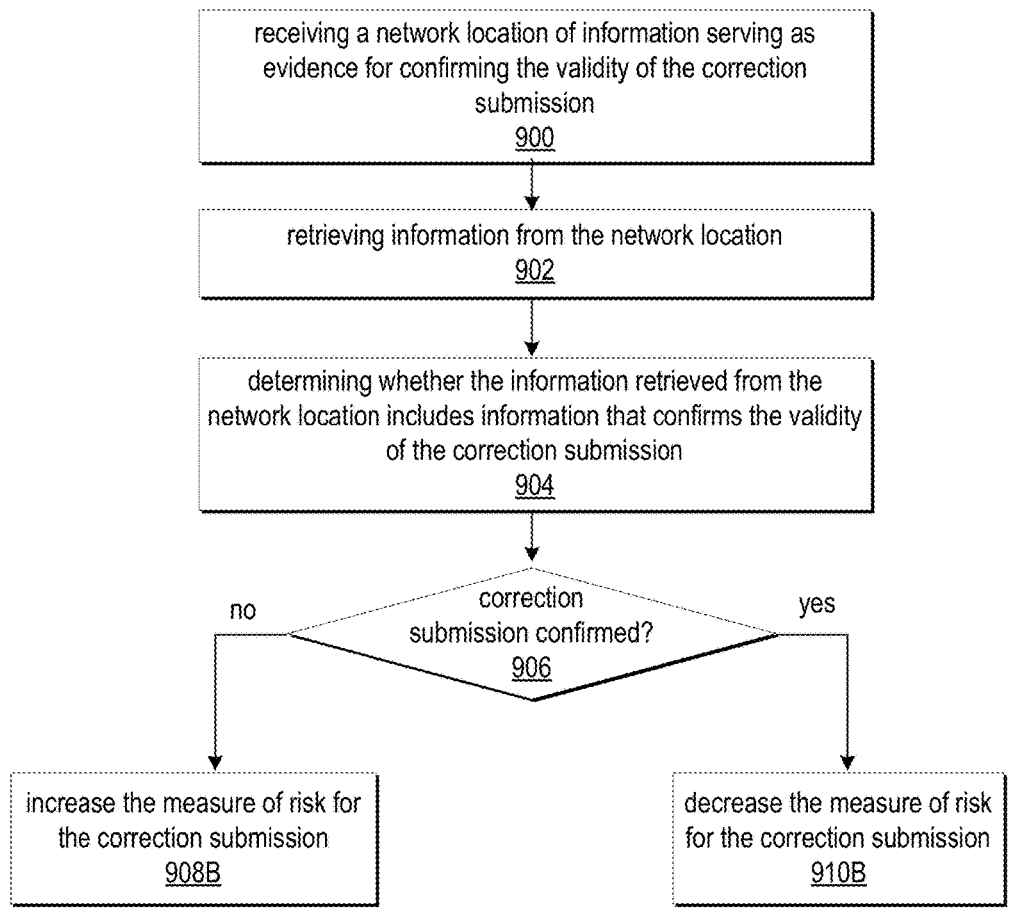

FIG. 9B illustrates another example method for receiving, evaluating and using the correction validation information. In the illustrated method, blocks 902-906 may be similar or identical to the like-numbered blocks of FIG. 9A. However, in this example embodiment, instead of accepting or rejecting the correction submission based on the validation (or lack of validation) of the correction submission, the method of FIG. 9B may incorporate the validation result of the correction submission into the generation of a measure of risk for the correction submission. Examples of measures of risk includes the risk scores described above (see, e.g., FIGS. 5A-6). In various embodiments, if it is determined that the information retrieved from the specified network address does not validate the correction submission (e.g., negative output of block 906), the method may include increasing the measure of risk for the correction submission (908B). For instance, irrespective of whether the correction submission is confirmed, a risk score (or other measure of risk) may be generated for the correction submission according to any of the techniques described herein (see, e.g., FIGS. 5A-6). At block 908B, this measure of risk may be increased (e.g., scaled or weighted) by some fixed or relative amount in order to increase the risk associated with automatically accepting the proposed modification specified by the correction submission. For instance, when using the acceptance techniques described above (see, e.g., FIGS. 5A-6), increasing the measure of risk at block 908B may decrease the chance that the proposed modification of the correction submission will actually be implemented.

In various embodiments, if it is determined that the retrieved information does validate the correction submission (e.g., positive output of block 906), the method may include decreasing the risk score for the correction submission (block 910B). For instance, irrespective of whether the correction submission is confirmed, a risk score (or other measure of risk) may be generated for the correction submission according to any of the techniques described herein (see, e.g., FIGS. 5A-6). At block 910B, this measure of risk may be decreased (e.g., scaled or weighted) by some fixed or relative amount in order to decrease the risk associated with automatically accepting the proposed modification specified by the correction submission. For instance, when using the acceptance techniques described above (see, e.g., FIGS. 5A-6), decreasing the measure of risk at block 810B may increase the chance that the proposed modification of the correction submission will actually be implemented.

In various embodiments, different levels of confidence may be associated with different information sources. For instance, as described above, the network location may specify a web page from vendor site 102, a manufacturer's website, or a web site from another party or location. In various embodiments, the method may include assigning a level of confidence to information received from these different sources. For instance, web pages retrieved from vendor site 102 may be assigned a higher confidence level than a web page form a manufacturer's website. Similarly, a web page form a manufacturer's website may be assigned a higher confidence level than a web page from a third party web page (e.g., an individual's blog). In various embodiments, the method may include modifying or scaling the measures of risk (e.g., the risk scores described herein) based on the aforesaid confidence levels. For instance, in one embodiment, the risk may be modified inversely with the confidence level of the data source. That is, as the confidence level increases, the measure of risk associated with a correction submission decreases (and vice versa). For instance, in some embodiments, highly trusted sources (e.g., web pages of vendor site 102) may decrease a correction submission's risk score whereas less trusted sources (e.g., an individual's blog) may increase a correction submission's risk score.

In various embodiments, a list of trusted and/or untrusted data sources may be maintained (e.g., by vendor site 102), which may include network domains, for example. In some embodiments, the sources of correction validation information may be screened based on such list(s). For instance, the method may include determining that the network domain associated with the submitted network address is on the list of trusted data sources or, alternatively, on the list of untrusted data sources. For trusted domains, the correction submission may be accepted and/or the measure of risk for that correction submission may be reduced. For untrusted domains, the correction submission may be rejected and/or the measure of risk for that correction submission may be increased. For domains with unknown trust levels, these domains may be added to the trusted or untrusted lists over time dependent upon historical results. In one non-limiting example, a network domain (e.g., of a manufacturer's website) that provides correct information 95% of the time may be added to the list of trusted list of data sources. Similarly, some data sources may migrate from one list to another if their performance changes over time. For instance, a trusted domain that begins to provide inaccurate information over time may be moved from the trusted list to the untrusted list. In various embodiments, addition or removal from the trusted or untrusted lists may be completely automated or may include some element of human review.

In various embodiments, the trustworthiness of information from a given network location (e.g., a web page) may be determined by comparing known information to that web page. In one example, consider a case where a correction submitter provides a URL to a web page as evidence that validates the submitter's correction submission for an item. In this case, embodiments may include inferring that the URL identifies trusted information as a result of determining that the web page of that URL includes a certain percentage (e.g., 98%) of the vendor site 102's known information for the item in question. For instance, if vendor site 102 has various product attributes for a product (which the vendor may already trust) and the provided URL points to a web page that also includes many of these same attributes, embodiments may include inferring that the web page and/or associated domain is trusted source of quality information. As such, in some cases, this may result in a higher confidence level for data retrieved from that URL and/or associated domain.

In various embodiments, correction submission may be validated with existing information within or accessible to vendor site 102. For instance, vendor site 102 may, for a given item, store item description information from each supplier that supplies that item to the vendor. This may include information from multiple, and in some cases many, different suppliers. In some cases, not all of this information ends up as part of an item detail page for the respective item (e.g., referred to as unpublished item information). As such, in some embodiments, vendor site 102 may leverage this extra information by evaluating the validity of correction submissions with the unpublished item information.

In various embodiments, the network traffic associated with items may affect the ultimate measure of risk assigned to that item. For instance, for a given correction submission for an item, the measures of risk (e.g., risk score) for that correction submission may be scaled up or down based on the quantity of network traffic for the respective item detail page during some time period. Generally, the higher the traffic for an item's item detail page, the higher the risk associated with changing that item's item detail page information, and vice versa. In one non-limiting example, it may be more risky to change an item detail page exposed to millions of users per week than it is to change an item detail page exposed to a few hundred users per week.

As noted above, different network locations and/or images may be provided as supporting evidence for correction submissions. Some embodiments may include storing such network locations and/or images for handling of subsequent correction submissions. For instance, consider a case in which a correction submission includes a URL to highly accurate item information at a manufacturer's website. If some other correction submission is received at a later time without supporting evidence (e.g., without a URL), the previous URL known to be highly accurate may be reused for the new correction submission. Similar techniques may be applied to images. For instance, if one correction submission has supporting evidence that includes an image of detailed product information (e.g., a picture of product packaging with in-depth textual information about the product), that image may be cached and reused for other correction submission received in the future (e.g., corrections submissions which may not necessarily be provided with supporting evidence). Even in cases where supporting evidence is provided, older supporting evidence may be used in lieu of new supporting evidence if it is determined that the new supporting evidence is of lower quality and/or accuracy.

Figure 10:
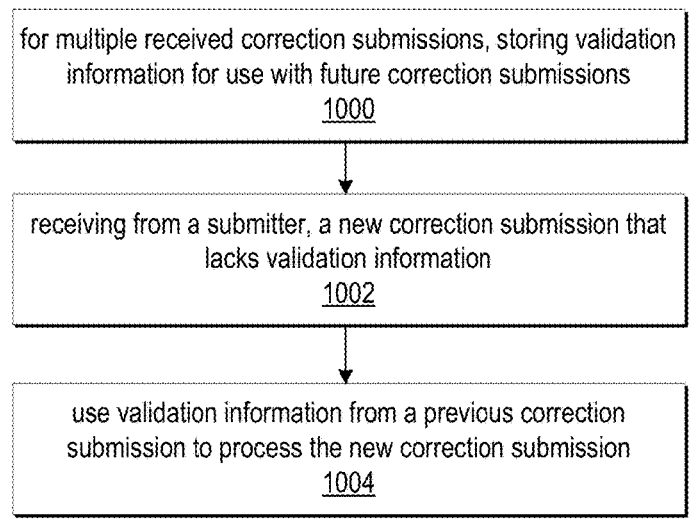
FIG. 10 illustrates a flowchart of an example method for storing and using validation information from previous correction submissions in order to process a new correction submission that may lack validation information, according to some embodiments.

FIG. 10 illustrates an example method for storing and using validation information from previous correction submissions in order to process a new correction submission that may lack validation information. As illustrated at block 1000, the method may include, for multiple received correction submissions, storing validation information for use with future correction submissions. For instance, in some embodiments, each time a correction submission is received for a particular item, the method may include storing the validation information for that submission (e.g., an image, URL or any other validation information described herein) in a record for that item. In some embodiments, this portion of the method could also include storing information about the structure of web sites (e.g., a manufacture's website) or other network-based resources in order to use such information for processing new correction submissions. For instance, any of the techniques described above regarding the use of a manufacturers website to locate item information (see e.g., the tree structure example described above with respect to FIGS. 8A-9B) may be used. This structure information may be stored for a given item such that (as described in more detail below) the manufacturer's web site may be consulted in the future for other requests for the same item (e.g., requests that may lack the requisite validation information).

As illustrated at block 1002, the method may include receiving from a submitter, a new correction submission that lacks validation information. For instance, in many of the requests described above, validation information may include an image or URL that verifies the proposed modification of the submitter's request. Embodiments may still be able to verify requests lacking validation information using the techniques described below with respect to block 1004.

As illustrated at block 1004, the method may include using validation from a previous correction submission to process the new correction submission (received at block 1002). For instance, the request may pertain to a particular item, and this portion of the method may include retrieving validation information previously stored for that particular item (e.g., as described with respect to block 1000). In one example, one or more images from previous correction submissions may be used for the new correction submission. These images may be evaluated according to any of the techniques described herein (e.g., machine recognition techniques) in order to determine whether the validity of the information in the new correction submission is confirmed. In another example, block 1004 may include reusing a previously received URL to retrieve validation information. In some cases, the method may include using the URL structure information described above in order to generate a new URL for validating the current correction submission. For instance, a URL stored for a different item may be restructured to create a new URL for the current item being evaluated (e.g., by switching the model number in the URL). In some cases, embodiments may also query the submitter for additional verification information, such as by sending the submitter a message using consumer response module 208 described above.

Example Computer System

Various embodiments of the system and method for evaluating correction submissions with supporting evidence, as described herein, may be executed on one or more computer systems, which may interact with various other devices. Note that any component, action, or functionality described above with respect to FIGS. 1-10 may be implemented on one or more computers configured as computer system 1100 of FIG. 11, according to various embodiments. In the illustrated embodiment, computer system 1100 includes one or more processors 1110 coupled to a system memory 1120 via an input/output (I/O) interface 1130. Computer system 1100 further includes a network interface 1140 coupled to I/O interface 1130, and one or more input/output devices 1150, such as cursor control device 1160, keyboard 1170, and display(s) 1180. In some cases, it is contemplated that embodiments may be implemented using a single instance of computer system 1100, while in other embodiments multiple such systems, or multiple nodes making up computer system 1100, may be configured to host different portions or instances of embodiments. For example, in one embodiment some elements may be implemented via one or more nodes of computer system 1100 that are distinct from those nodes implementing other elements.

In various embodiments, computer system 1100 may be a uniprocessor system including one processor 1110, or a multiprocessor system including several processors 1110 (e.g., two, four, eight, or another suitable number). Processors 1110 may be any suitable processor capable of executing instructions. For example, in various embodiments processors 1110 may be general-purpose or embedded processors implementing any of a variety of instruction set architectures (ISAs), such as the x86, PowerPC, SPARC, or MIPS ISAs, or any other suitable ISA. In multiprocessor systems, each of processors 1110 may commonly, but not necessarily, implement the same ISA.

System memory 1120 may be configured to store program instructions 1122 and/or data 1132 accessible by processor 1110. In various embodiments, system memory 1120 may be implemented using any suitable memory technology, such as static random access memory (SRAM), synchronous dynamic RAM (SDRAM), nonvolatile/Flash-type memory, or any other type of memory. In the illustrated embodiment, program instructions 1122 may be configured to implement any functionality described above including but not limited to that of evaluation component 202 described above. Additionally, data 1132 of memory 1120 may store any of the information or data structures described above, including but not limited to the data and/or information of correction submission 124 (as well as the supporting evidence described above, e.g., images or network locations), consumer profiles 212, trouble words 214, item descriptions 216, correction log 218, and/or offensive words 222. In some embodiments, program instructions and/or data may be received, sent or stored upon different types of computer-accessible media or on similar media separate from system memory 1120 or computer system 1100. While computer system 1100 is described as implementing the functionality of functional blocks of previous Figures, any of the functionality described herein may be implemented via such a computer system.

In one embodiment, I/O interface 1130 may be configured to coordinate I/O traffic between processor 1110, system memory 1120, and any peripheral devices in the device, including network interface 1140 or other peripheral interfaces, such as input/output devices 1150. In some embodiments, I/O interface 1130 may perform any necessary protocol, timing or other data transformations to convert data signals from one component (e.g., system memory 1120) into a format suitable for use by another component (e.g., processor 1110). In some embodiments, I/O interface 1130 may include support for devices attached through various types of peripheral buses, such as a variant of the Peripheral Component Interconnect (PCI) bus standard or the Universal Serial Bus (USB) standard, for example. In some embodiments, the function of I/O interface 1130 may be split into two or more separate components, such as a north bridge and a south bridge, for example. Also, in some embodiments some or all of the functionality of I/O interface 1130, such as an interface to system memory 1120, may be incorporated directly into processor 1110.

Network interface 1140 may be configured to allow data to be exchanged between computer system 1100 and other devices attached to a network 1185 (e.g., customer device 122 or external network locations 1190, such as the network locations provided by a submitters supporting evidence for a correction submission) or between nodes of computer system 1100. Network 1185 may in various embodiments include one or more networks including but not limited to Local Area Networks (LANs) (e.g., an Ethernet or corporate network), Wide Area Networks (WANs) (e.g., the Internet), wireless data networks, some other electronic data network, or some combination thereof. In various embodiments, network interface 1140 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 1150 may, in some embodiments, include one or more display terminals, keyboards, keypads, touchpads, scanning devices, voice or optical recognition devices, or any other devices suitable for entering or accessing data by one or more computer systems 1100. Multiple input/output devices 1150 may be present in computer system 1100 or may be distributed on various nodes of computer system 1100. In some embodiments, similar input/output devices may be separate from computer system 1100 and may interact with one or more nodes of computer system 1100 through a wired or wireless connection, such as over network interface 1140.

Figure 11:
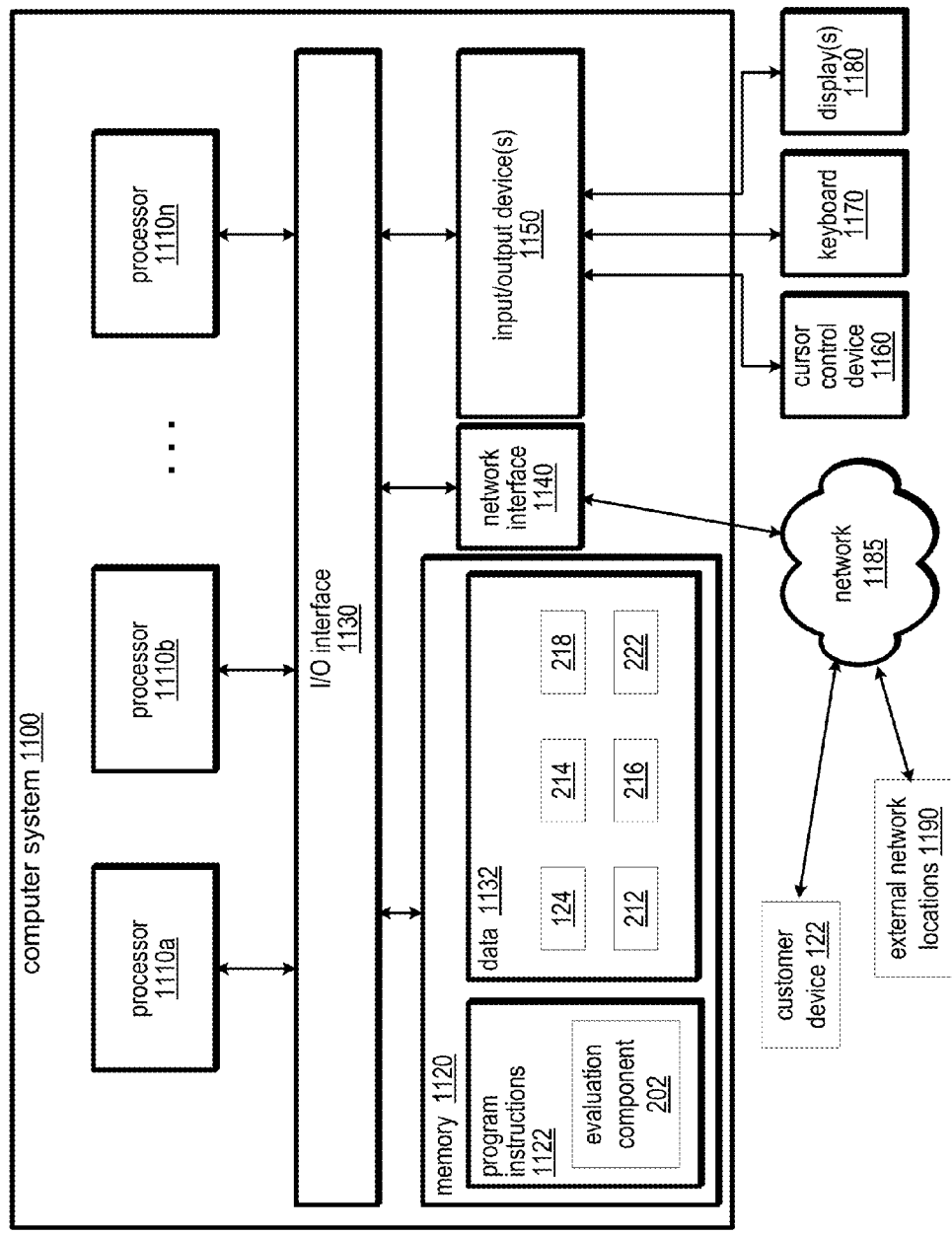
FIG. 11 illustrates one example of a computer system suitable for implementing various elements of the systems and methods for evaluating correction submissions, according to some embodiments.

As shown in FIG. 11, memory 1120 may include program instructions 1122, which may be processor-executable to implement any element or action described above. In one embodiment, the program instructions may implement the methods described above, such as the methods illustrated by FIGS. 5A-6 and 8A-10. In other embodiments, different elements and data may be included. Note that data 1132 may include any data or information described above.

Those skilled in the art will appreciate that computer system 1100 is merely illustrative and is not intended to limit the scope of embodiments. In particular, the computer system and devices may include any combination of hardware or software that can perform the indicated functions, including computers, network devices, Internet appliances, PDAs, wireless phones, pagers, etc. Computer system 1100 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 1100 may be transmitted to computer system 1100 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Embodiments may be provided as a computer program product including a nontransitory machine-readable (e.g., computer-readable) storage medium having stored thereon instructions (in compressed or uncompressed form) that may be used to program a computer (or other electronic device) to perform processes or methods described herein. The machine-readable storage medium may include, but is not limited to, hard drives, floppy diskettes, optical disks, CD-ROMs, DVDs, read-only memories (ROMs), random access memories (RAMs), EPROMs, EEPROMs, flash memory, magnetic or optical cards, solid-state memory devices, or other types of media/machine-readable medium suitable for storing electronic instructions. Further, embodiments may also be provided as a computer program product including a transitory machine-readable signal (in compressed or uncompressed form). Examples of machine-readable signals, whether modulated using a carrier or not, include, but are not limited to, signals that a computer system or machine hosting or running a computer program can be configured to access, including signals downloaded through the Internet or other networks. For example, distribution of software may be Internet download.

The methods described herein may be implemented in software, hardware, or a combination thereof, in different embodiments. In addition, the order of the blocks of the methods may be changed, and various elements may be added, reordered, combined, omitted, modified, etc. Various modifications and changes may be made as would be obvious to a person skilled in the art having the benefit of this disclosure. The various embodiments described herein are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the exemplary configurations may be implemented as a combined structure or component. These and other variations, modifications, additions, and improvements may fall within the scope of embodiments as defined in the claims that follow.

While various embodiments have been illustrated and described, including the preferred embodiment, it will be appreciated that various changes can be made therein without departing from the spirit and scope of the invention.

What is claimed is:

1. A method, comprising:
performing, by program instructions executed by one or more hardware processors:
providing item description information available for display via a network-based site concurrent with a corresponding item being available for sale via the network-based site;
subsequent to the item description information being provided for display via the network-based site and subsequent to a submitter being provided, via the network-based site, with the item description information for the corresponding item offered for sale, receiving, via components of a correction submission user interface for submitting one or more corrections to the item description information, a correction submission specified by the submitter, wherein the receiving comprises:
receiving, via a field of the correction submission user interface, a proposed modification to one or more item attributes in the item description information displayed via the network-based site; and
receiving, via another field of the correction submission user interface, supporting evidence information that establishes credibility for, or acts as evidence of correctness of, the proposed modification to the one or more item attributes in the item description information;
subsequent to said receiving the correction submission comprising the proposed modification and supporting evidence information,
evaluating, by the program instructions executed by the one or more hardware processors, and based at least in part on the supporting evidence information, a correctness of the proposed modification;
generating, based at least in part on the correctness of the proposed modification, an indication that specifies whether the proposed modification to the item description information is permitted to be performed;
updating, based at least in part on an indication that the proposed modification is permitted, the one or more item attributes in accordance with the proposed modification; and
subsequent to receipt, from over a network, of a request for the item description information for the item offered for sale, transmitting the updated one or more item attributes over the network.

2. The method of claim 1,
wherein the user interface further comprises one or more fields configured to receive an indication of a source of the supporting evidence information; and
wherein said evaluation further comprises evaluating the source of the information for verifying the proposed modification.

3. The method of claim 2, wherein the information for verifying a validity of the proposed modification comprises one or more images from the submitter, the one or more images submitted as evidence for confirming the validity of the proposed modification.

4. The method of claim 3, wherein the one or more images include at least one of: an image of the item offered for sale, or an image of item packaging for the item offered for sale.

5. The method of claim 3, wherein said evaluation of the information for verifying the validity of the proposed modification comprises:
determining whether the one or more images include information that confirms the validity of the proposed modification.

6. The method of claim 5, wherein determining whether the one or more images include information that confirms the validity of the proposed modification comprises:
evaluating the one or more images with one or more machine recognition techniques to determine whether the one or more images contain information that confirms the validity of the proposed modification.

7. A system, comprising:
a memory; and
one or more processors coupled to the memory, wherein the memory comprises program instructions that when executed by the one or more processors are configured to:
provide item description information available for display via a network-based site concurrent with a corresponding item being available for sale;
subsequent to the item description information being provided for display via the network-based site and subsequent to a submitter being provided, via the network-based site, with the item description information for the corresponding item offered for sale, receive a correction submission proposed modification specified by the submitter via a user interface, the correction submission specifying a proposed modification to one or more item attributes in the item description information displayed via the network-based site, and the user interface for specifying the proposed modification comprising:
one or more graphical user interface correction fields configured to receive the proposed modification; and
one or more other graphical user interface correction support fields configured to receive supporting evidence information that establishes credibility for or acts as evidence of correctness of the proposed modification to the one or more item attributes in the item description;
subsequent to said receive the correction submission comprising the proposed modification and supporting evidence information,
evaluate, based at least in part on the supporting evidence information, a correctness of the proposed modification;
generate, based, at least in part, on the correctness of the proposed modification, an indication that specifies whether the proposed modification to the item description information is permitted to be performed; and
subject to the permission:
update the item description information in accordance with the proposed modification; and
subsequent to receipt, from over a network, of a request for the item description information for the item offered for sale, transmit the item description information over the network.

8. The system of claim 7,
wherein the user interface further comprises one or more fields configured to receive an indication of a source of the information for verifying the proposed modification, and
wherein said generate the indication that specifies whether the proposed modification to the item description information is permitted to be performed is further based on an evaluation of the source of the information for verifying the proposed modification.

9. The system of claim 8, wherein the one or more fields configured to receive information for verifying the proposed modification are further configured to:
receive one or more images from the submitter, the one or more images submitted as evidence for confirming a validity of the proposed modification.

10. The system of claim 9, wherein the program instructions are further executable to:
determine whether the one or more images include information that confirms the validity of the proposed modification.

11. The system of claim 10, wherein to determine whether the one or more images include information that confirms the validity of the proposed modification, the program instructions are further executable to:
evaluate the one or more images with one or more machine recognition techniques to determine whether the one or more images contain information that confirms the validity of the proposed modification.

12. The system of claim 10, wherein the program instructions are further executable to:
in response to a determination that the one or more images include information that confirms the validity of the proposed modification, reduce a measure of risk associated with the proposed modification, wherein the measure of risk is used to determine whether the proposed modification to the item description information is permitted to be performed.

13. The system of claim 7, wherein the program instructions are further executable to:
receive from the submitter of the proposed modification, a network location of information serving as evidence for confirming a validity of the proposed modification;
retrieve information from the network location; and
determine whether the information retrieved from the network location includes information that confirms the validity of the proposed modification.

14. A non-transitory computer-readable storage medium, storing program instructions computer-executable on a computer to:
provide item description information for display via a network-based site concurrent with a corresponding item being available for sale on the network-based site;
subsequent to the item description information being provided for display via the network-based site and subsequent to a submitter being provided, via the network-based site, with the item description information for the corresponding item offered for sale, and in response to receiving a correction submission specified by the submitter, the correction submission specifying:
a proposed modification to one or more item attributes in the item description information displayed via the network-based site; and
supporting evidence information that established credibility for or acts as evidence of correctness the proposed modification to the one or more item attributes in the item description information;
subsequent to said receiving the correction submission comprising the proposed modification and supporting evidence information,
evaluate, based at least in part on the supporting evidence information, a correctness of the proposed modification;
generate, based at least in part on the correctness of the proposed modification, an indication that specifies whether the proposed modification to the item description information is permitted to be performed; and
subject to the permission:
update the one or more item attributes in accordance with the proposed modification; and
subsequent to receipt, from over a network, of a request for the item description information for the item offered for sale, transmit the updated one or more item attributes over the network.

15. The non-transitory computer-readable storage medium of claim 14,
wherein the correction submission further specifies one or more fields configured to receive an indication of a source of the information for verifying the proposed modification, and
wherein to generate the indication that specifies whether the proposed modification to the item description information is permitted to be performed, the program instructions are further executable to generate the indication further based on an evaluation of the source of the information for verifying the proposed modification.

16. The non-transitory computer-readable storage medium of claim 15, wherein the program instructions are further executable to:
receive one or more images from the submitter, the one or more images submitted as evidence for confirming a validity of the proposed modification.

17. The non-transitory computer-readable storage medium of claim 16, wherein the program instructions are further executable to:
determine whether the one or more images include information that confirms the validity of the proposed modification.

18. The non-transitory computer-readable storage medium of claim 17, wherein to determine whether the one or more images include information that confirms the validity of the proposed modification, the program instructions are further executable to:
evaluate the one or more images with one or more machine recognition techniques to determine whether the one or more images contain information that confirms the validity of the proposed modification.

19. The non-transitory computer-readable storage medium of claim 17, wherein the program instructions are further executable to:
in response to determining that the one or more images include information that confirms the validity of the proposed modification, reduce a risk score, wherein the risk score is used to determine whether the proposed modification to the item description information is permitted to be performed.

20. The non-transitory computer-readable storage medium of claim 14, wherein the program instructions are executable to:
receive from the submitter of the proposed modification, a network location of information serving as evidence for confirming a validity of the proposed modification;
retrieve information from the network location; and
determine whether the information retrieved from the network location includes information that confirms the validity of the proposed modification.

* * * * *